US009483036B2

(12) United States Patent
Kaku et al.

(10) Patent No.: US 9,483,036 B2
(45) Date of Patent: Nov. 1, 2016

(54) MOTOR CONTROL APPARATUS HAVING PART FOR PHASE COMPENSATION

(71) Applicant: KABUSHIKI KAISHA YASKAWA DENKI, Kitakyushi-shi (JP)

(72) Inventors: Yasuhiko Kaku, Kitakyushu (JP); Tetsuya Asai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 12 days.

(21) Appl. No.: 14/667,682

(22) Filed: Mar. 25, 2015

(65) Prior Publication Data

US 2015/0198935 A1 Jul. 16, 2015

Related U.S. Application Data

(63) Continuation of application No. PCT/JP2012/074585, filed on Sep. 25, 2012.

(51) Int. Cl.

*G05B 13/00* (2006.01)
*G05B 13/04* (2006.01)
*H02P 23/12* (2006.01)
*H02P 7/06* (2006.01)

(52) U.S. Cl.

CPC ............... *G05B 13/047* (2013.01); *H02P 7/06* (2013.01); *H02P 23/12* (2013.01)

(58) Field of Classification Search

CPC ........ G05B 13/047; H02P 7/06; H02P 23/12
USPC ........................................................ 318/561
See application file for complete search history.

(56) References Cited

U.S. PATENT DOCUMENTS

2002/0060538 A1* 5/2002 Hara .................... B62D 5/0466 318/432
2007/0137924 A1* 6/2007 Kawada ................ B62D 5/046 180/446
2009/0192679 A1* 7/2009 Kobayashi ........... B62D 5/0463 701/42
2011/0005855 A1* 1/2011 Mikamo ................ H02P 21/04 180/443
2011/0089912 A1* 4/2011 Kamata ......................... 323/205
2011/0234144 A1* 9/2011 Maekawa .............. H02P 23/04 318/702

FOREIGN PATENT DOCUMENTS

JP 2002-252991 9/2002
JP 2005-073477 3/2005
JP 2008-299573 12/2008

OTHER PUBLICATIONS

Japanese Office Action for corresponding JP Application No. 2014-537874, Feb. 3, 2016.
International Search Report for corresponding International Application No. PCT/JP2012/074585, Dec. 18, 2012.

(Continued)

*Primary Examiner* — Erick Glass
(74) *Attorney, Agent, or Firm* — Mori & Ward, LLP

(57) ABSTRACT

This disclosure discloses a motor control apparatus including a current conversion part, a voltage control part, a current detection part, and a phase compensation part. The current conversion part generates a voltage command on the basis of a current deviation between a current command and an estimated current. The voltage control part controls an output voltage to a motor. The current detection part detects a motor current. The phase compensation part inputs the detected motor current and the voltage command and outputs, as the estimated current, the motor current in which a delay in phase of the motor current relative to the current command has been compensated.

11 Claims, 30 Drawing Sheets

(56) References Cited

OTHER PUBLICATIONS

Written Opinion for corresponding International Application No. PCT/JP2012/074585, Dec. 18, 2012.

The International Preliminary Report on Patentability (Chapter I) with translation of Written Opinion of the International Searching Authority for corresponding International Application No. PCT/JP2012/074585, Apr. 9, 2015.

* cited by examiner

MOTOR CONTROL APPARATUS HAVING PART FOR PHASE COMPENSATION

CROSS-REFERENCE TO RELATED APPLICATION

This is a continuation application PCT/JP2012/074585, filed Sep. 25, 2012, which was published under PCT article 21(2) in English.

TECHNICAL FIELD

An embodiment disclosed herein relates to a motor control apparatus.

BACKGROUND

A motor control apparatus including a current amplifier model that performs an operation that is the same as current control is known.

SUMMARY

According to one aspect of the disclosure, there is provided a motor control apparatus including a current conversion part, a voltage control part, a current detection part, and a phase compensation part. The current conversion part generates a voltage command on the basis of a current deviation between a current command and an estimated current. The voltage control part controls an output voltage to a motor on the basis of the voltage command. The current detection part detects a motor current to be supplied to the motor. The phase compensation part inputs the detected motor current and the voltage command and outputs, as the estimated current, the motor current in which a delay in phase of the motor current relative to the current command has been compensated.

DESCRIPTION OF THE EMBODIMENTS

In the following, embodiments will be described with reference to the drawings.

<General Configuration of Motor Controller>

Figure 1:
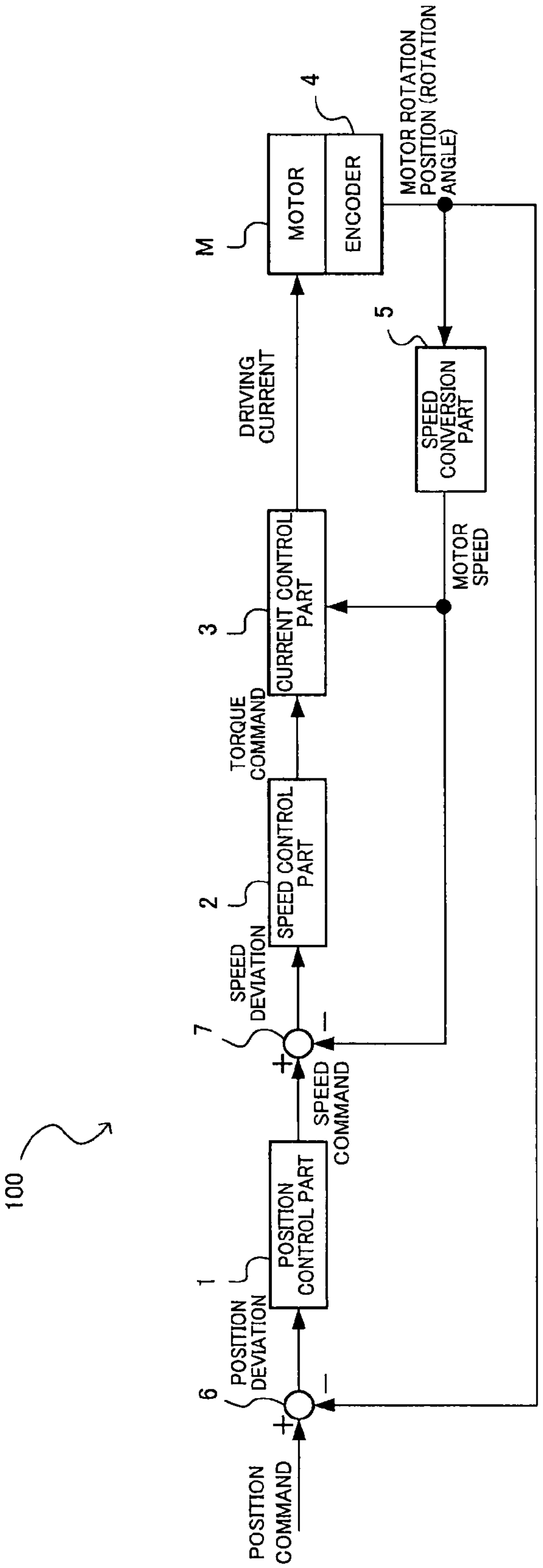
FIG. 1 is a block diagram illustrating a general system configuration of a motor control apparatus of an embodiment.

First, a schematic configuration of a motor control apparatus related to the present embodiment will be described by using FIG. 1. As illustrated in FIG. 1, a motor control apparatus 100 controls a rotation position (a rotation angle) of a motor M on the basis of a position command input from a host controller (not illustrated in particular). Incidentally, it is assumed that illustration and description in the following are description wholly in the format of transfer function. In FIG. 1, the motor control apparatus 100 of the present embodiment includes a position control part 1, a speed control part 2, a current control part 3, an encoder 4, and a speed conversion part 5.

The position control part 1 controls, on the basis of a position deviation which is input via a subtractor 6 and which is a difference between the position command and the rotation position of the motor M that the later described encoder 4 has detected, so as to reduce the position deviation and outputs a speed command.

The speed control part 2 controls, on the basis of a speed deviation which is input via a subtractor 7 and which is a difference between a speed command from the position control part 1 and a motor speed that the later described speed conversion part 5 has output, so as to reduce the speed deviation and outputs a torque command.

The current control part 3 outputs a driving current by PWM control to the motor M on the basis of the torque command from the speed control part 2 and the motor speed that the later described speed conversion part 5 has output. Incidentally, a configuration of the current control part 3 will be described in detail later (see later described FIG. 2).

The motor M generates a torque by the driving current from the current control part 3 and drives a load machine (not illustrated in particular).

The encoder 4 is configured, for example, by a rotary encoder that is mechanically coupled to a rotor of the motor M. The encoder 4 detects the rotation position of the motor M.

The speed conversion part 5 converts a change in rotation position of the motor M that the encoder 4 has detected into the motor speed of the motor M. Specifically, differentiators may be used for the speed conversion part 5.

The motor control apparatus 100 of the present embodiment so configured has a triple loop configuration including a feedback loop of a position control system, a feedback loop of a speed control system and a feedback loop of a current control system. That is, the motor control apparatus 100 includes the feedback loop of the position control system (hereinafter, referred to as a position control system loop) that after the position command has been input from the not illustrated host controller, a control signal and a detection signal are transferred in order of the position control part 1, the speed control part 2, the current control part 3, the motor M and the encoder 4 to perform feedback. In addition, the motor control apparatus 100 also includes the feedback loop of the speed control system (hereinafter, referred to as a speed control system loop) that the control signal and the detection signal are transferred in order of the speed control part 2, the current control part 3, the motor M, the encoder 4 and the speed conversion part 5 to perform feedback. Further, in the present embodiment, the feedback loop of the current control system (hereinafter, referred to as a current control system loop) is also included in the current control part 3. In the following, an internal configuration and the current control system loop of the current control part 3 will be described in detail.

<Internal Configuration of Current Control Part>

Figure 2:
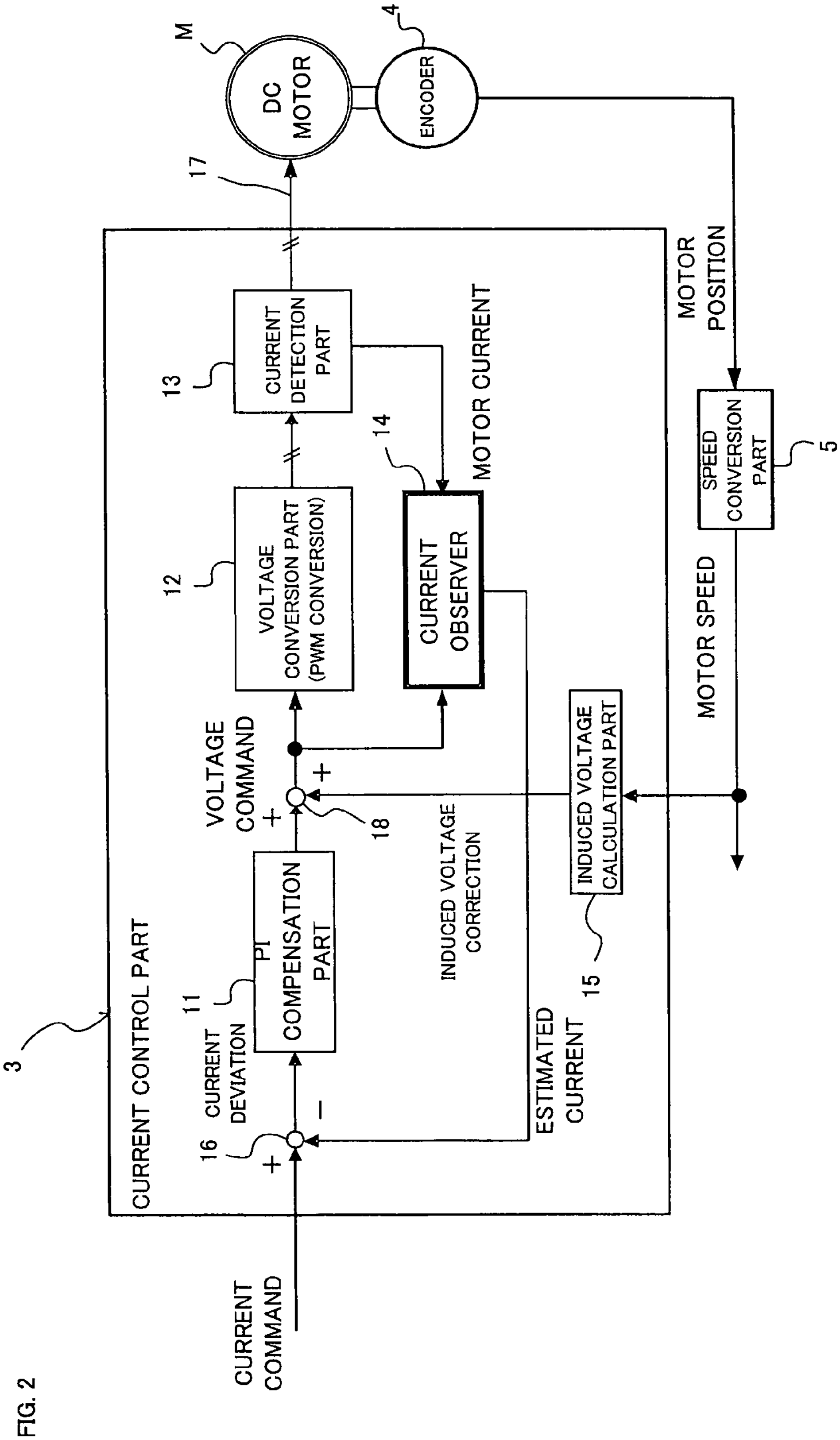
FIG. 2 is a block diagram illustrating a system configuration of a current control part.

The internal configuration of the current control part 3 is illustrated in a block diagram of FIG. 2. In FIG. 2, the current control part 3 includes a PI compensation part 11, a voltage conversion part 12, a current detection part 13, a current observer 14 and an induced voltage calculation part 15. Incidentally, in the following, in order to facilitate description and understanding, description will be made by assuming that a DC motor is used as the motor M. In this case, since the motor M generates the torque that is proportional to the current, the torque command output from the speed control part 2 in FIG. 1 is to be handled as the one that has been converted into a corresponding current command and is denoted as the current command in FIG. 2 (the same shall apply hereinafter).

The PI compensation part 11 controls, on the basis a current deviation which is input via a subtractor 16 and which is a difference between the current command an estimated current that the later described current observer 14 has output, so as to reduce the current deviation and outputs a voltage command. Specifically, the PI compensation part 11 performs a so-called PI calculation in which a proportional calculation (a P calculation) and an integration calculation (an I calculation) are performed in parallel on the current deviation, and outputs a voltage command. In the above-described calculations, a gain in the proportional calculation corresponds to a current loop gain (not illustrated in particular).

The voltage conversion part 12 controls an output voltage by PWM control on the basis of the voltage command output from the PI compensation part 11 and outputs a driving current to the motor M. That is, the voltage conversion part 12 performs so called PWM control (Pulse Width Modulation control) in which a rectangular driving voltage whose pulse width fluctuates in accordance with comparison between the voltage command output from the PI compensation part 11 and a triangle wave that has been separately generated at a predetermined frequency is output to control the magnitude of a driving power to be supplied to the motor M in a duty ratio of the pulse width. Incidentally, in the present embodiment, the voltage conversion part 12 illustrated in the drawing supplies the driving current to the DC motor M via one pair of power lines 17 (single-phase power lines) in order to output the driving current to the DC motor M as described above.

The current detection part 13 includes, for example, a DCCT (Current Transformer) disposed on the power lines 17, a shunt resistor, an AD converter and so forth, detects the magnitude of the driving current to be supplied from the voltage conversion part 12 to the motor M and outputs a value thereof as an information signal of a motor current.

The current observer 14 outputs the motor current on a mathematical model that an error on actual operation of the voltage conversion part 12 has been regarded as a disturbance and removed on the basis of the voltage command that the PI compensation part 11 has output as an estimated current. In addition, the current observer 14 calculates the estimated current so as to stabilize the later described current control system loop with reference to the actual motor current that the current detection part 13 has detected. Incidentally, a configuration of the current observer 14 will be described in detail later.

The induced voltage calculation part 15 calculates and outputs an induced voltage generated when the driving power has been supplied to the motor M, that is, a counter electromotive voltage generated from an inductance component that is latent in the coil of the motor M on the basis of the motor speed that the speed conversion part 5 has output. The current control part 3 corrects the induced voltage by adding the induced voltage output from the induced voltage calculation part 15 to the voltage command output from the PI compensation part 11 by an adder 18 and inputs a voltage command that is the corrected induced voltage into the voltage conversion part 12 and the current observer 14.

The current control part 3 so configured includes the current control system loop that after the current command corresponding to the torque command from the speed control part 2 has been input, the control signal and the detection signal are transferred in order of the PI compensation part 11, the voltage conversion part 12, the current detection part 13 and the current observer 14 to perform feedback. It is possible for the current control system loop to improve a distortion of a waveform of the motor current caused by the error on the actual operation in the voltage conversion part 12 and to improve the response characteristic in the current control system loop owing to inclusion of the current observer 14. Incidentally, the PI compensation part 11 corresponds to an example, of a current conversion part described in each claim and the voltage conversion part 12 corresponds to an example of a voltage control part described in each claim.

<Current Observer of Simple Configuration>

Figure 3:
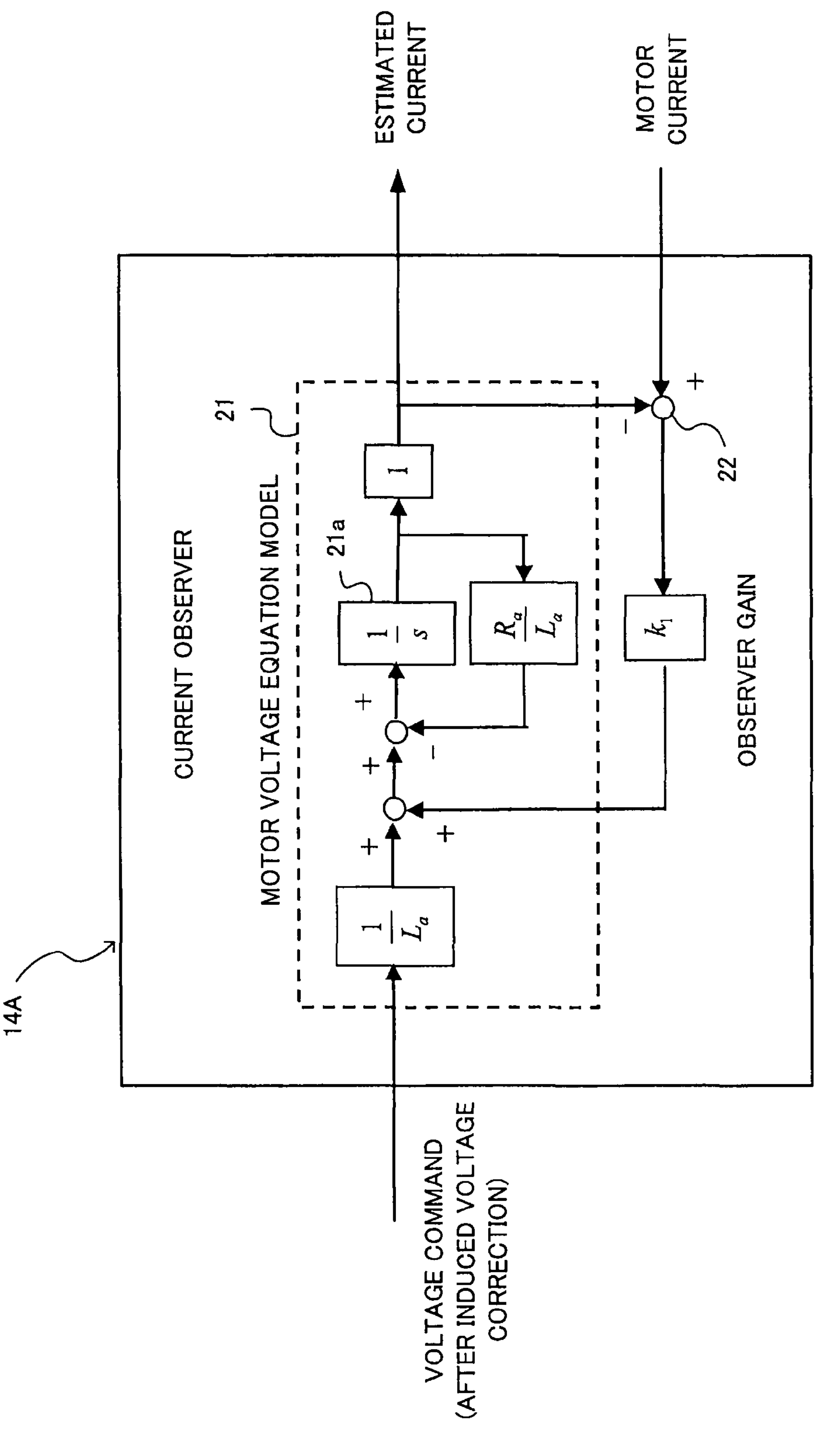
FIG. 3 is a detailed block diagram illustrating a current observer of simple configuration.

Here, FIG. 3 is a block diagram illustrating the current observer of simple configuration. In FIG. 3, a current observer 14A includes a motor voltage equation model 21 and one observer gain $k_1$.

The motor voltage equation model 21 is a model in which a motor voltage equation expressed by Formula (1) is expressed as a state equation from a voltage to be applied to the motor to a current flowing through winding of the motor.

$$v_a = R_a i_a + L_a \frac{d i_a}{dt} + e_a \tag{1}$$

Here, Ra is a motor winding resistance value, La is a motor winding inductance value, ea is an induced voltage value, ia is a motor current value and va is a motor voltage value.

The current observer 14A first inputs the voltage command in which the induced voltage has been corrected into the motor voltage equation model 21 and outputs the theoretical estimated current. On the other hand, a deviation between the estimated current and the actual motor current is taken by a subtractor 22, the deviation is multiplied by the appropriate observer gain $k_1$ and a value obtained is added to an input of an integrator 21*a* (1/s) included in the motor voltage equation model 21. Thereby, the current observer 14A outputs the motor current on the mathematical model in which the error on the actual operation in the current control part 3 has been removed as the estimated current. Further, it is possible for the current observer 14A to calculate the estimated current by reflecting a fluctuation portion of the motor current that has been actually detected and to output the estimated current with which the current control system loop can be stabilized.

However, since the actual voltage conversion part 12 is of the PWM system that controls the driving current in time average by changing the pulse width, the voltage conversion part 12 acts as a delay element of the current control system loop. Although the current observer 14A of a comparative example illustrated in FIG. 3 outputs the estimated current that is in a phase-delayed state relative to the current command, reflecting the delay element, in a case where the estimated current is fed back as it is, the entire current control system loop becomes liable to oscillate. In particular, in a case where the current loop gain of the PI compensation part 11 is set large, a phase delay of the high-frequency component in the current command becomes noticeable and thus the current control system loop readily oscillates. Therefore, it becomes difficult to increase the current loop gain and band widening of the current control system loop is restricted.

In addition, in the motor voltage equation model 21, respective parameters (Ra, La in the drawing) for the winding resistance, the inductance and so forth of the motor M are set. However, there is the possibility that due to a fluctuation in winding resistance caused by a temperature change of the winding, a fluctuation in inductance caused by a current change and so forth, the actual parameters may fluctuate relative to the parameters of the motor voltage equation model 21, or due to variations and so forth in actual values relative to design values, the actual parameters may not coincide with the parameters of the motor voltage equation model 21. In this case, a steady-state error occurs in the estimated current value of the current observer 14A and the value of the estimated current does not converge to a true value.

<Configuration of Phase Compensation Disturbance Current Observer of the Present Embodiment>

Figure 4:
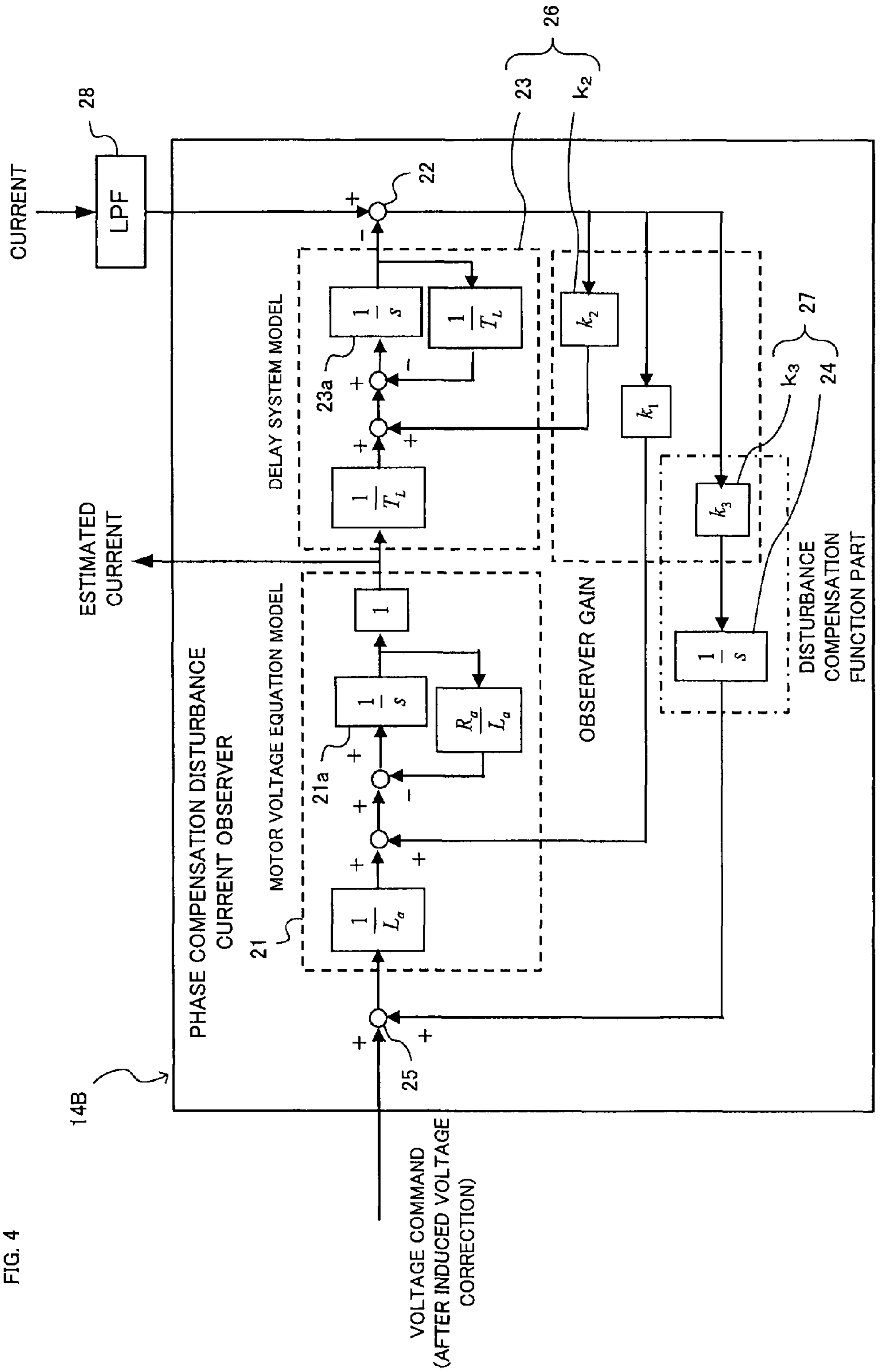
FIG. 4 is a detailed block diagram illustrating a phase compensation disturbance current observer.

In the present embodiment, a phase compensation disturbance current observer 14B configured by adding two functions, that is, phase compensation and disturbance compensation to the current observer 14 is applied. FIG. 4 is a block diagram illustrating the phase compensation disturbance current observer 14B. In FIG. 4, the phase compensation disturbance current observer 14B includes the motor voltage equation model 21 that is the same as that in FIG. 3, a delay system model 23, three observer gains $k_1$, $k_2$, $k_3$, and an integrator 24.

The delay system model 23 is a low-pass filter (a numerical model expressed by a transfer function) that has been serially connected to the rear stage of the motor voltage equation model 21. The delay system model 23 delays the phase of an input command on the basis of a time constant that has been set in advance.

The phase compensation disturbance current observer 14B first inputs the voltage command after the induced voltage is corrected into the motor voltage equation model 21 and outputs the theoretical estimated current. Further, the phase compensation disturbance current observer 14B inputs the estimated current into the delay system model 23 to delay the phase of the estimated current. A deviation between an output having a delayed phase and the actual motor current is taken by the subtractor 22, the deviation is multiplied by the appropriate observer gains $k_1$, $k_2$ and multiplied values are added to an input of integrator 21*a* (1/s), and to an input of integrator 23*a* (1/s), respectively which the motor voltage equation model 21 and the delay system model 23 include, respectively. In addition, the deviation is multiplied by the appropriate observer gain $k_3$ and an integrator 24 and a multiplied value is added to the voltage command (the voltage command after the induced voltage is corrected) by an adder 25 separately.

In this connection configuration, the output of the delay system model 23 is an output that has modelled the motor current that the voltage conversion part 12 outputs from both viewpoints of the gain and the response and may be supposed to be close to the actually output motor current (also a delay portion of a later described LPF 28 is taken into consideration in reality). After the deviation between the output of the delay system model 23 and the actually detected motor current has been compensated for respectively with the appropriate observer gains $k_1$, $k_2$, compensated values are added to the to the input of integrator 21*a* (1/s), and to the input of integrator 23*a* (1/s), respectively which the two models 21, 23 include, respectively and are circulated, and thereby it becomes possible to make the output of the delay system model 23 more approximate to the actual motor current. In this state, the output of the motor voltage equation model 21 may be regarded to be approximate to the motor current in which the phase delay has been removed. The phase compensation disturbance current observer 14B outputs this output as the estimated current having an advanced phase relative to the actual motor current. That is, in the phase compensation disturbance current observer 14B of the configuration, the delay system model 23 and the observer gain $k_2$ function as a phase compensation function part 26 that performs phase compensation.

In addition, the deviation between the output of the delay system model 23 and the actually detected motor current may be regarded as a disturbance that has occurred due to fluctuations in parameters in the actual voltage conversion part 12 and the motor M, variations and so forth relative to the design values. This disturbance is multiplied by the appropriate observer gain $k_3$ and the integrator 24 to obtain an estimated disturbance and the estimated disturbance is added to the voltage command and is circulated, thereby it is possible to output the output of the motor voltage equation model 21 as the estimated current in which the disturbance (the deviation) has been compensated for. That is, in the phase compensation disturbance current observer 14B of the configuration, the observer gain $k_3$ and the integrator 24 function as a disturbance compensation function part 27 that performs disturbance compensation.

Incidentally, in the present embodiment, as illustrated in FIG. 4, when the motor current detected by the current detection part 13 is to be input into the phase compensation disturbance current observer 14B, the motor current is input into the phase compensation disturbance current observer 14B after the high-frequency component has been removed by a low-pass filter (in the drawings and in the following, abbreviated as an LPF 28). Illustration of the LPF 28 is omitted in FIG. 2 and a role thereof will be described later.

Incidentally, the observer gain $k_1$ corresponds to an example of a first observer gain described in each claim, the observer gain $k_2$ corresponds to an example of a second observer gain described in each claim, the observer gain $k_3$ corresponds to an example of a third observer gain described in each claim, and the LPF 28 corresponds to an example of a low-pass filter described in each claim.

<Verification of Advantageous Effects of the Present Embodiment>

In the following, advantageous effects in terms of current control by the motor control apparatus 100 of the present embodiment will be verified also including the process of inspection performed this time by the inventors of the present application, while referring to simulation charts in FIG. 5 to FIG. 28. Incidentally, in the following, verification will be made in two aspects of 1: phase compensation and 2: disturbance compensation.

<Verification 1-1: Case of Current Observer of Simple Configuration>

A case where the current observer 14A of simple configuration illustrated in FIG. 3 is included in the current control system loop in the current control part 3 in FIG. 2 will be described. Simulation results of a step response in this case are illustrated in FIG. 5 to FIG. 9.

Figure 5:
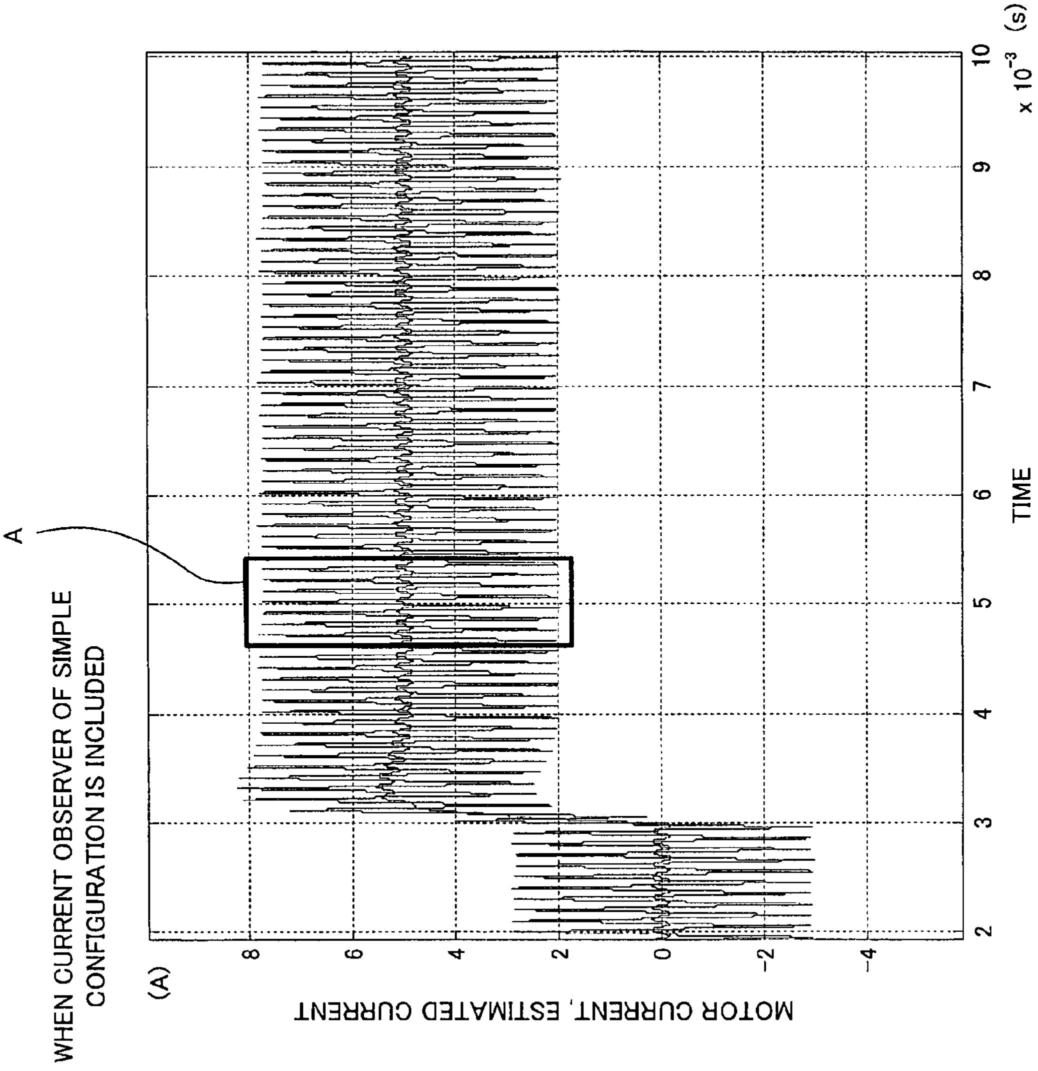
FIG. 5 is a chart illustrating a step response waveform of a motor current when the current observer of simple configuration is included.

FIG. 5 illustrates the step response of the motor current when the current command has been switched from 0 A to 5 A. In FIG. 5, the motor current output from the voltage conversion part 12 is increased in the step response in accordance with instantaneous switching of the current command to be input into the current control part 3 from 0 A to 5 A after 0.00 3 seconds from the start of simulation.

Figure 6:
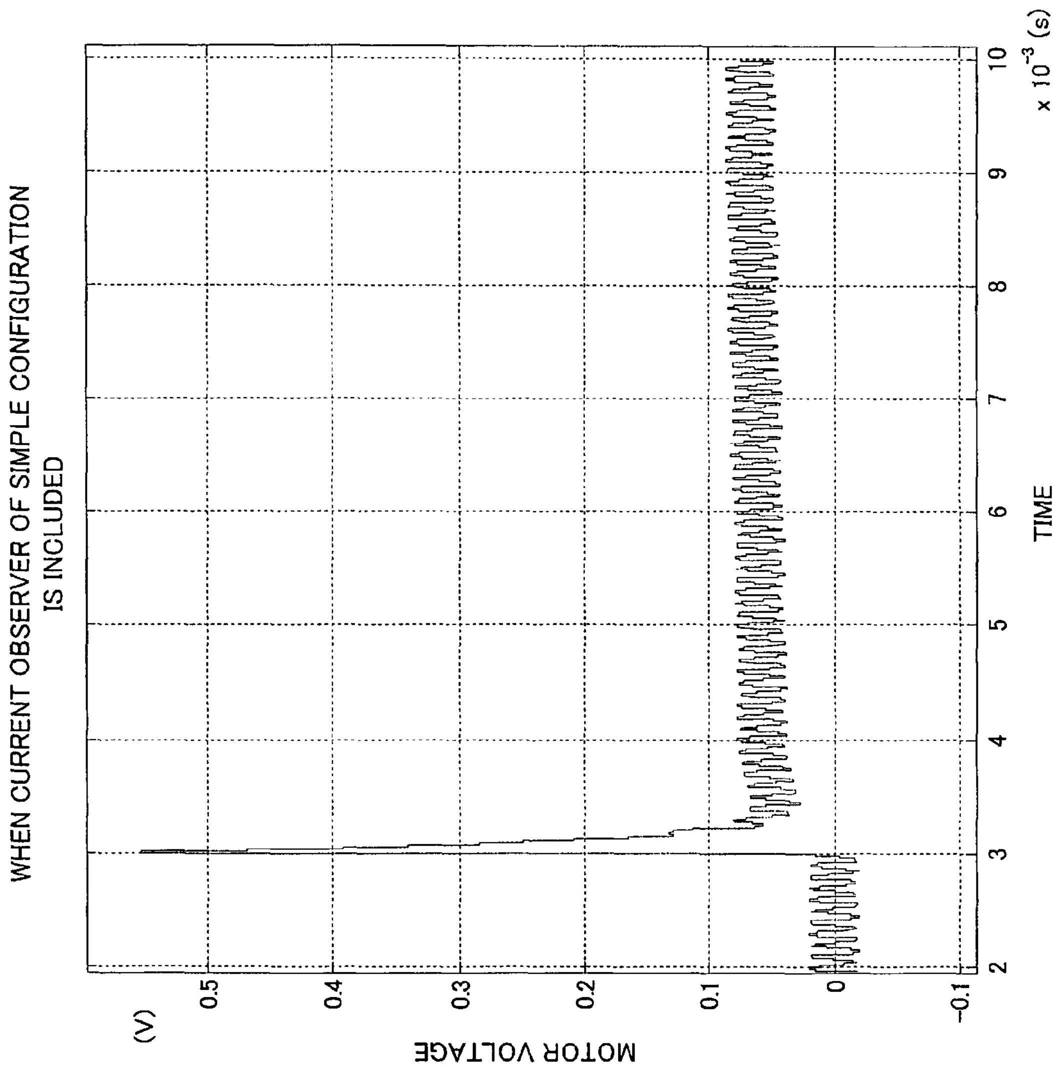
FIG. 6 is a chart illustrating a step response waveform of a motor voltage when the current observer of simple configuration is included.

Here, although the high-frequency component of a predetermined frequency is superimposed on the waveform of the illustrated motor current, this arises from the fact that the voltage conversion part 12 is performing PWM control. That is, the high-frequency component of the frequency that is the same as that of the triangle wave being generated in order to perform PWM control in the voltage conversion part 12 is superimposed on the waveform of the motor current. Superimposition of the high-frequency component is also observed in the waveform of the motor voltage (the voltage command that the voltage conversion part 12 outputs) illustrated in FIG. 6 at the same frequency. Incidentally, although when a stepped current command is input in the current control system loop, the motor current naturally exhibits the waveform of the step response as illustrated in FIG. 5, the waveform of the motor voltage exhibits an impulse-shaped peak waveform as illustrated in FIG. 6 in a period of transition of the waveform. This is because the voltage command is a command obtained by multiplying the signal of the current deviation by the gain, that is, the voltage command in a current control system feedback loop roughly has a differentiation waveform of a current response, and this peak level is acceptable unless otherwise saturated.

Figure 7:
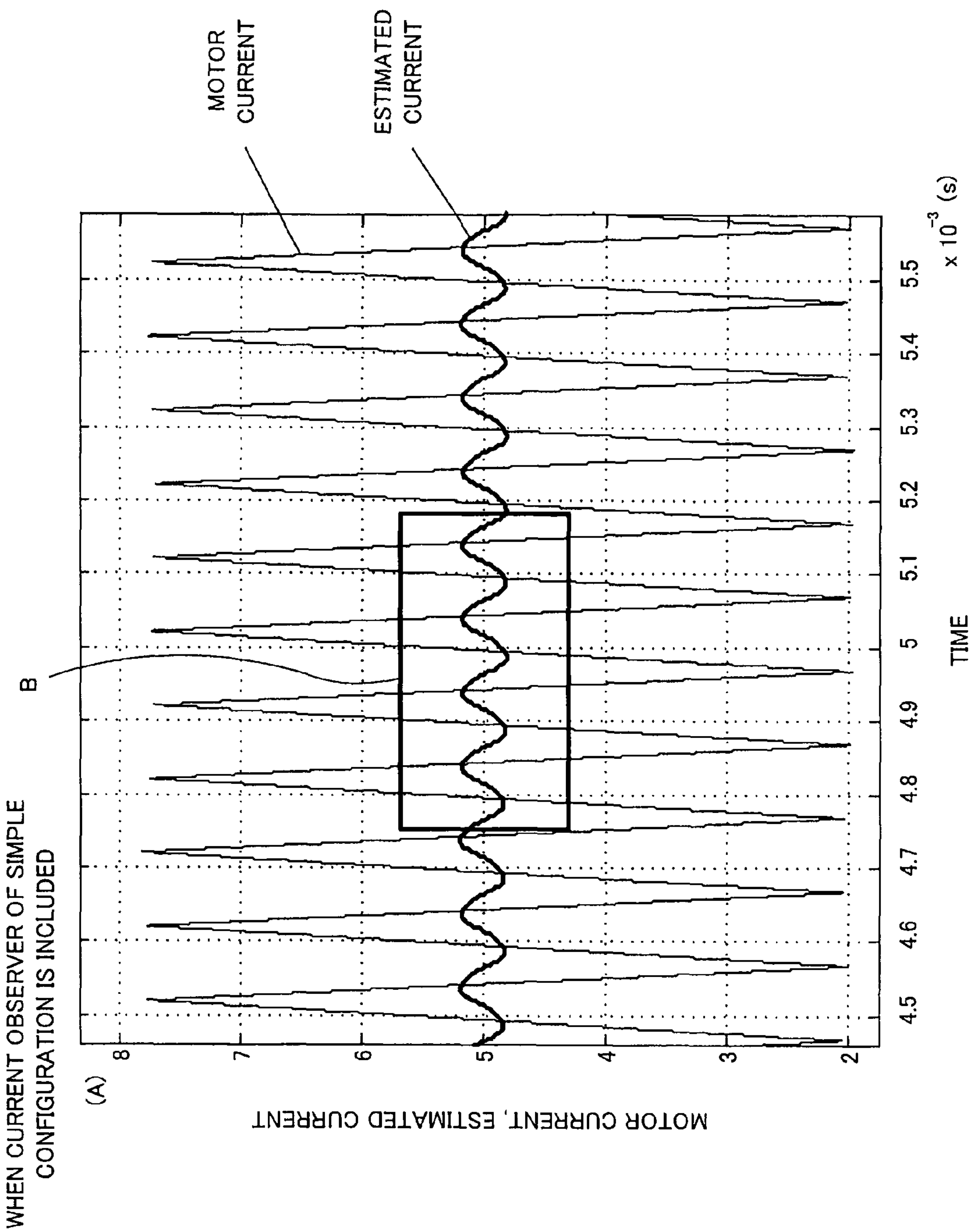
FIG. 7 is an enlarged chart of a part A in FIG. 5.

In addition, as illustrated in FIG. 7 that is an enlarged chart of a part A in FIG. 5, it is seen that the high-frequency component that is superimposed on the waveform of the motor current is the triangle wave. This is, although the motor voltage is output in the rectangular form by PWM control performed by the voltage conversion part 12, the waveform of the input motor current is shaped into the triangle waveform in this way by an integral action induced by the inductance component in the coil of the motor M. In addition, a thick line illustrated in FIG. 5 and FIG. 7 indicates a waveform of the estimated current that the current observer 14A outputs. As illustrated in the drawings, it is seen that the estimated current is oscillating in synchronization with the motor current in the same cycle as that of the triangle wave of the motor current. The amplitude of oscillation of the estimated current is suppressed in comparison with the amplitude of the triangle wave of the motor current in this way because the current observer 14A itself has the function as the low-pass filter. In the following, the waveform of the triangle wave to be superimposed on the motor current and the motor voltage and an oscillatory waveform of the estimated current will be respectively referred to as ripple waveforms.

Figure 8:
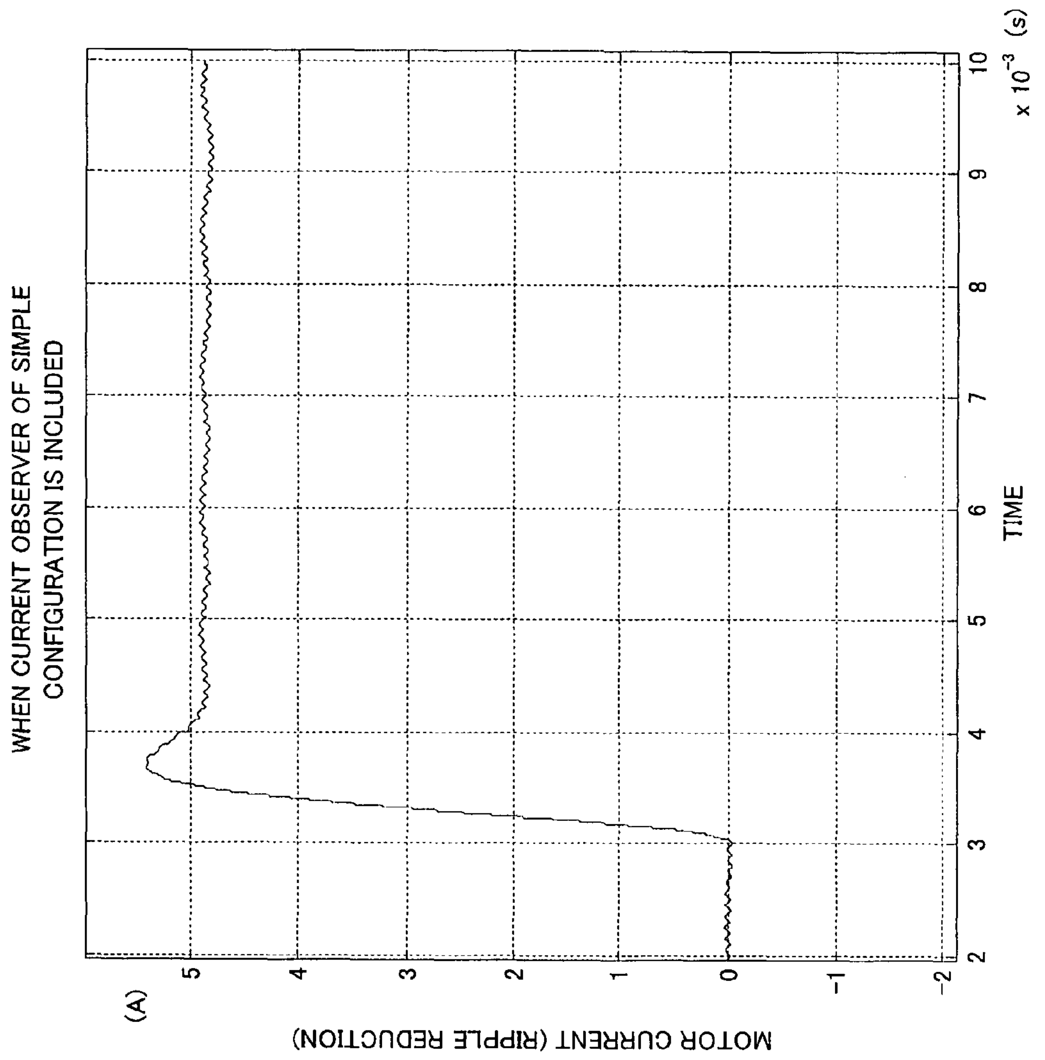
FIG. 8 is a chart illustrating a step response waveform of a motor current observed again by reducing ripple components from the waveform in FIG. 5.

Here, FIG. 8 is a chart illustrating the motor current that has been observed again with a ripple component reduced in the waveform of the motor current in FIG. 5 through the low-pass filter. When looking at FIG. 8, it is seen that in the steady state of the step response, the motor current does not reach a target value (5 A in this example) of the current command (indicating a steady value of approximately 4.8 A in average). In a case where the motor current that the current control part 3 outputs does not reach the current command in this way, it acts as an unstable factor for the position control system loop and the speed control system loop of the entire motor control apparatus 100. When the inventors of the present application have examined this situation, it has been newly found this time that the reason why it is difficult for the motor current to reach the target value of the current command in the current control system loop that includes the current observer 14A in FIG. 3 lies in asymmetry of the ripple waveform.

<Verification 1-2: Asymmetry of Ripple Waveform>

First, the ripple waveform of the motor current is to be originally arranged vertically symmetrically, centering around 5 A of the current command. However, it is seen from the simulation result in FIG. 7 that the ripple waveform of the motor current is arranged vertically asymmetrically relative to 5 A of the current command. That is, it is seen that the entire ripple waveform oscillates centering around a value (approximately 4.8 A) that is lower than 5 A, from the situation that while all high peak points of the ripple waveform are lower than 8 A, all low peak points of the ripple waveform are almost 2 A. It is conceivable that the ripple waveform is arranged vertically asymmetrically as described above because of two points, that is a point that a beat phenomenon occurs in the voltage conversion part 12 and a point that it is difficult for the response speed of the current observer 14A to follow the ripple waveform.

As described above, in PWM control performed by the voltage conversion part 12, the voltage of the rectangular form (a pulse form) is generated and output by comparison of the triangle wave that has been generated as a carrier signal with the waveform of the voltage command. However, the ripple waveform is also superimposed on the voltage command to be input into the voltage conversion part 12 by feeding back the component of the ripple waveform that synchronizes with the triangle wave via the motor current and the estimated current in the current control system loop. Therefore, in PWM control in the voltage conversion part 12, the carrier signal and the input command signal are brought into a relation that the carrier signal and the input command signal oscillate in the same cycle, and thereby such a beat phenomenon occurs that the value of the duty ratio of the pulse waveform to be output is offset from the true value by a waving action.

In addition, although the entire of the motor control apparatus 100 of the present embodiment is implemented by software of a computer, it is difficult for the current observer 14A that is one part of the motor control apparatus 100 to accurately follow a change of the ripple waveform of the motor current due to insufficiency in response speed thereof. Also in this respect, the current control system loop allows offset of the motor current.

Figure 9:
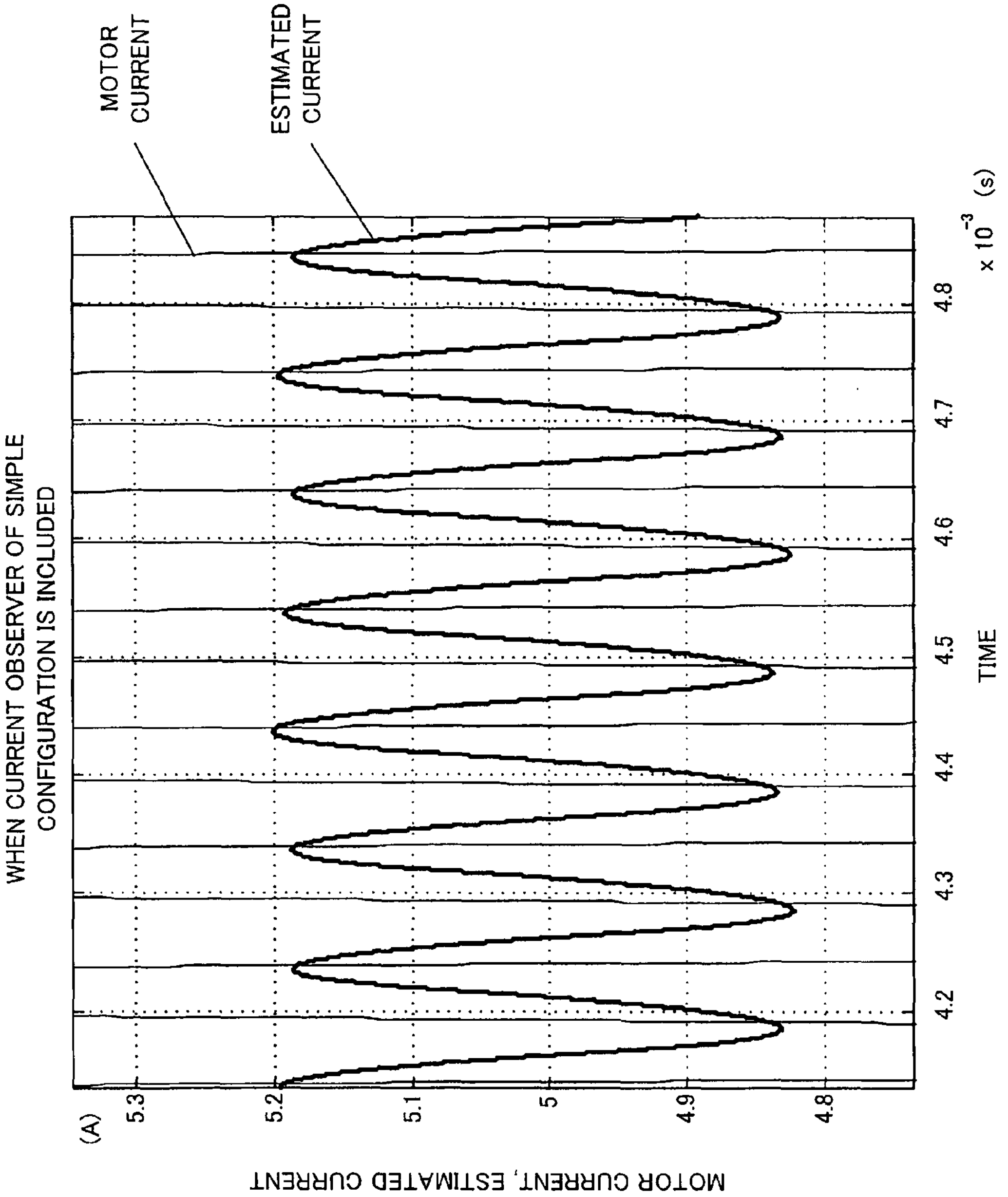
FIG. 9 is an enlarged chart of a part B in FIG. 7.

That is, occurrence of a descent offset (bottom lowering in a DC component) of the motor current as illustrated in FIG. 7 is caused by two factors, that is, a hardware factor due to inclusion of the voltage conversion part 12 that performs PWM control in the current control system loop and a software factor that the response speed of the current observer 14A is insufficient. In addition, the current observer 14A (see FIG. 3) of simple configuration outputs the ripple waveform of the estimated current by conversely offsetting the ripple waveform ascendingly in order to compensate for the descent offset, influenced by such a descent offset of the motor current. With respect to the ascent offset of the estimated current, it is possible to confirm it also from the situation that the ripple waveform of the estimated current oscillates centering around a value that is higher than 5 A as illustrated in FIG. 9 that is an enlarged chart of a part B in FIG. 7. Since the estimated current is fed-back, leaving the steady state error caused by the ascent offset of the estimated current as it is in this way, the motor current is offset descendingly in the steady state also in the entire current control system loop and its value does not converge to the target value of the current command.

Thus, the inventors of the present application conceived of two methods as a method for reducing adverse effects caused by asymmetry of the ripple waveform as described above, that is, a: a method of reducing the amplitude of the ripple waveform of the motor current via the LPF 28 and b: a method by gain-up of the current observer 14A.

<Verification 1-2a: Reduction of Amplitude of Ripple Waveform by LPF>

First, it is conceivable to suppress occurrence of the beat phenomenon in the voltage conversion part 12 by reducing the amplitude of the ripple waveform by applying the LPF 28 (see FIG. 4) to the motor current. That is, the motor current detected by the current detection part 13 is made to pass through the LPF 28 and thereafter is input into the current observer 14A in FIG. 3 (not illustrated in particular). Simulation results in this case are illustrated in FIG. 10 to FIG. 12.

Figure 10:
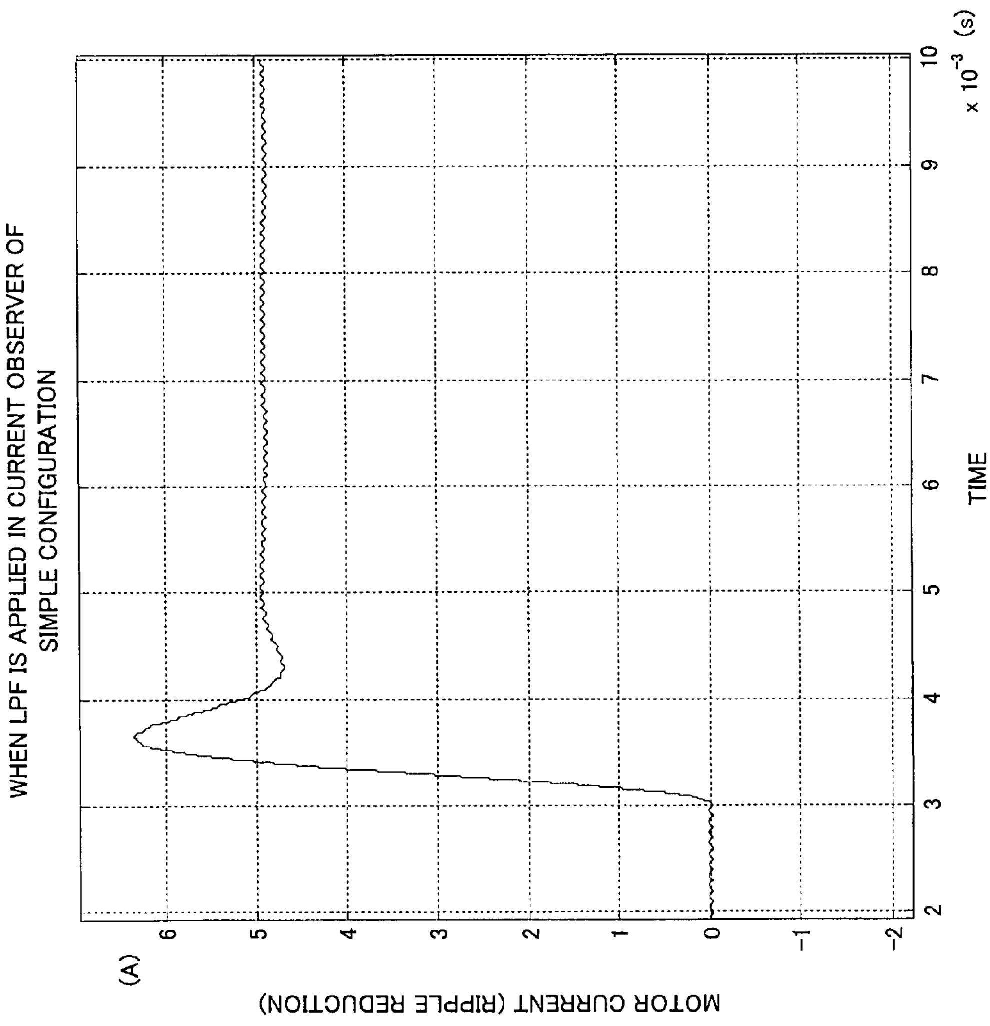
FIG. 10 is a chart corresponding to FIG. 8 when an LPF is applied in the current observer of simple configuration.
Figure 11:
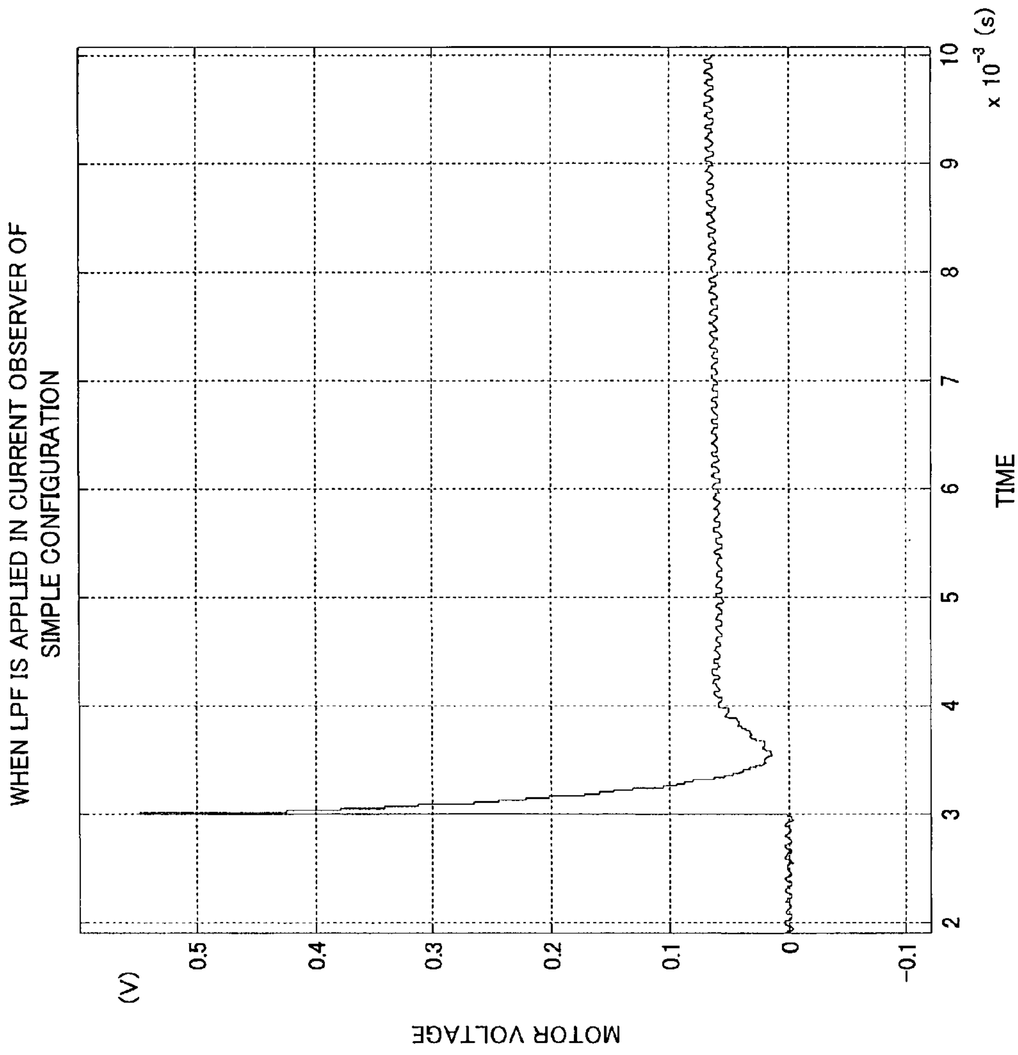
FIG. 11 is a chart illustrating a step response waveform of the motor voltage when the LPF is applied in the current observer of simple configuration.
Figure 12:
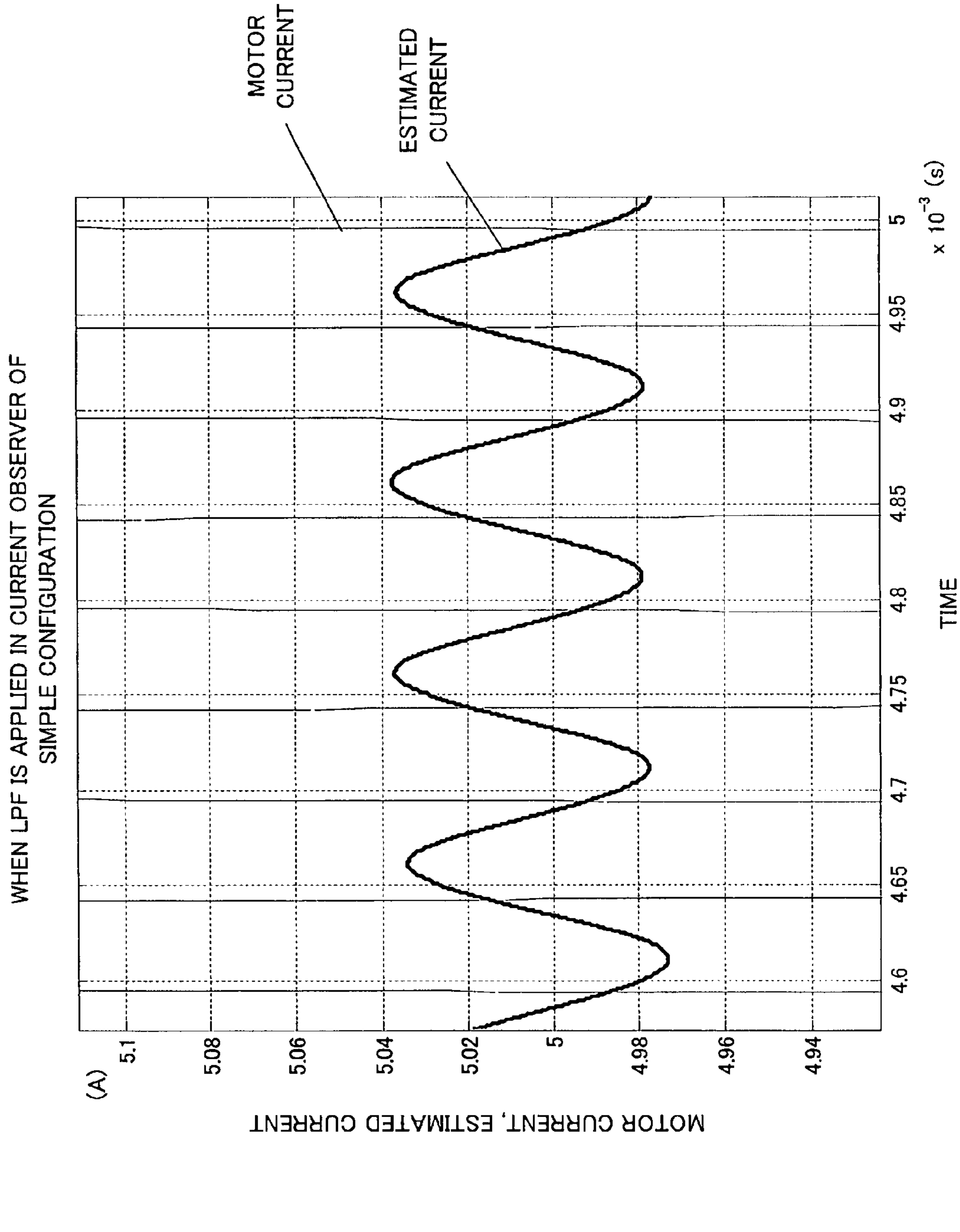
FIG. 12 is a chart corresponding to FIG. 9 when the LPF is applied in the current observer of simple configuration.

In a case where the LPF 28 was applied to the motor current just before input into the current observer 14A, the step response of the motor current corresponding to that in FIG. 8 was as illustrated in FIG. 10 and the step response of the motor voltage corresponding to that in FIG. 6 was as illustrated in FIG. 11. As apparent from the both drawings, it is confirmed that the beat phenomenon was suppressed by reducing the ripple waveform. As a result, as illustrated in FIG. 10, it is confirmed that the motor current in the steady state of the step response rose and approached the target value of the current command (although it was approximately 4.8 A in FIG. 8, it was improved up to approximately 4.9 A in FIG. 10). However, as illustrated in FIG. 12 corresponding to FIG. 9, although the amplitude of the ripple waveform of the estimated current was suppressed, the ripple waveform of the estimated current is still vertically asymmetric relative to 5 A of the current command. Therefore, it is still difficult to make the motor current reach the target value of 5 A.

<Verification 1-2b: Gain-Up of Current Observer>

Then, in order to promote further improvement, gain-up of the current control system loop was also performed in conjunction with the reduction of the ripple waveform by the LPF 28. Specifically, the application bandwidth of the current observer 14A was increased by increasing the observer gain $k_1$ in the current observer 14A. Simulation results in this case are illustrated in FIG. 13 to FIG. 15.

Figure 13:
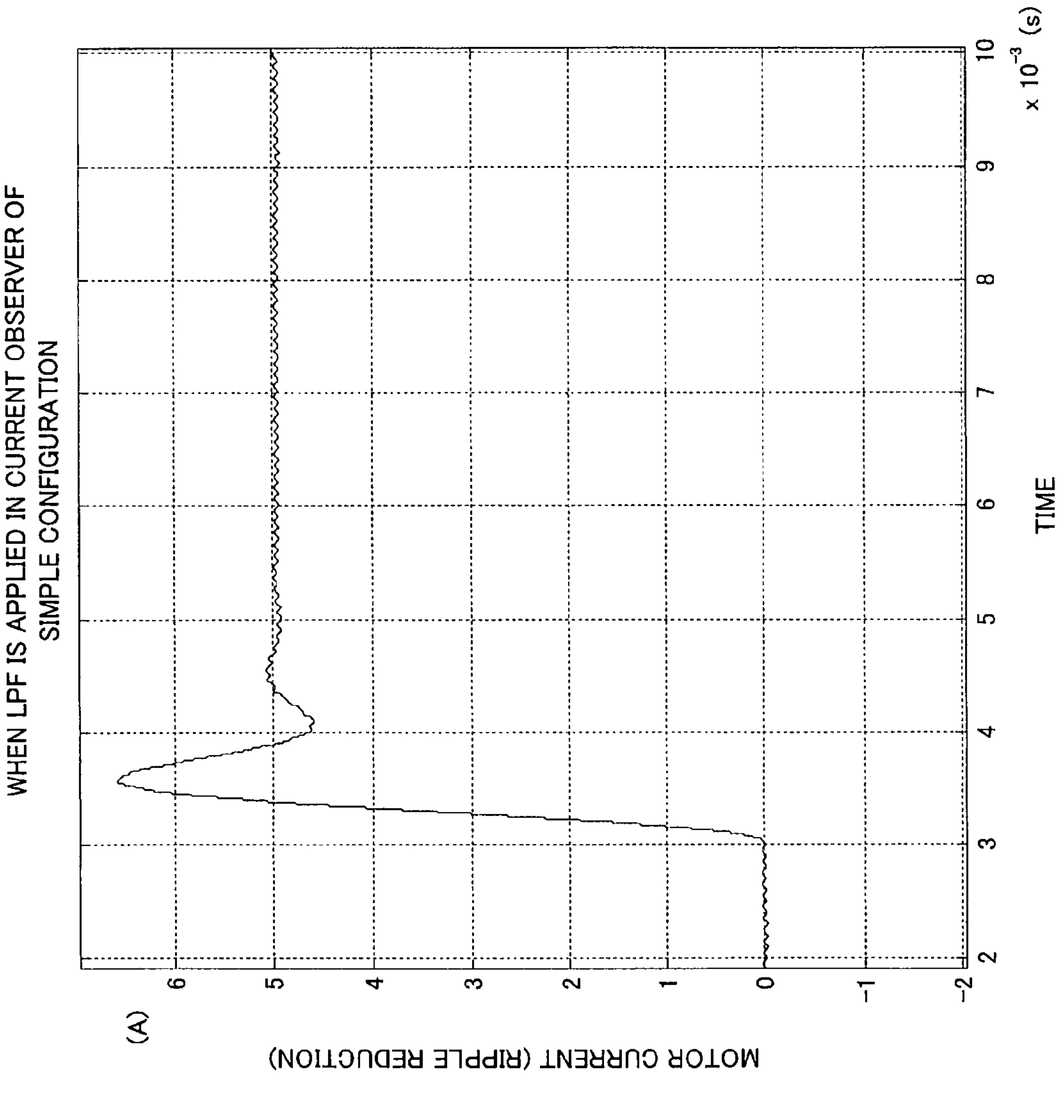
FIG. 13 is a chart corresponding to FIG. 8 when the LPF and gain-up are applied in the current observer of simple configuration.
Figure 14:
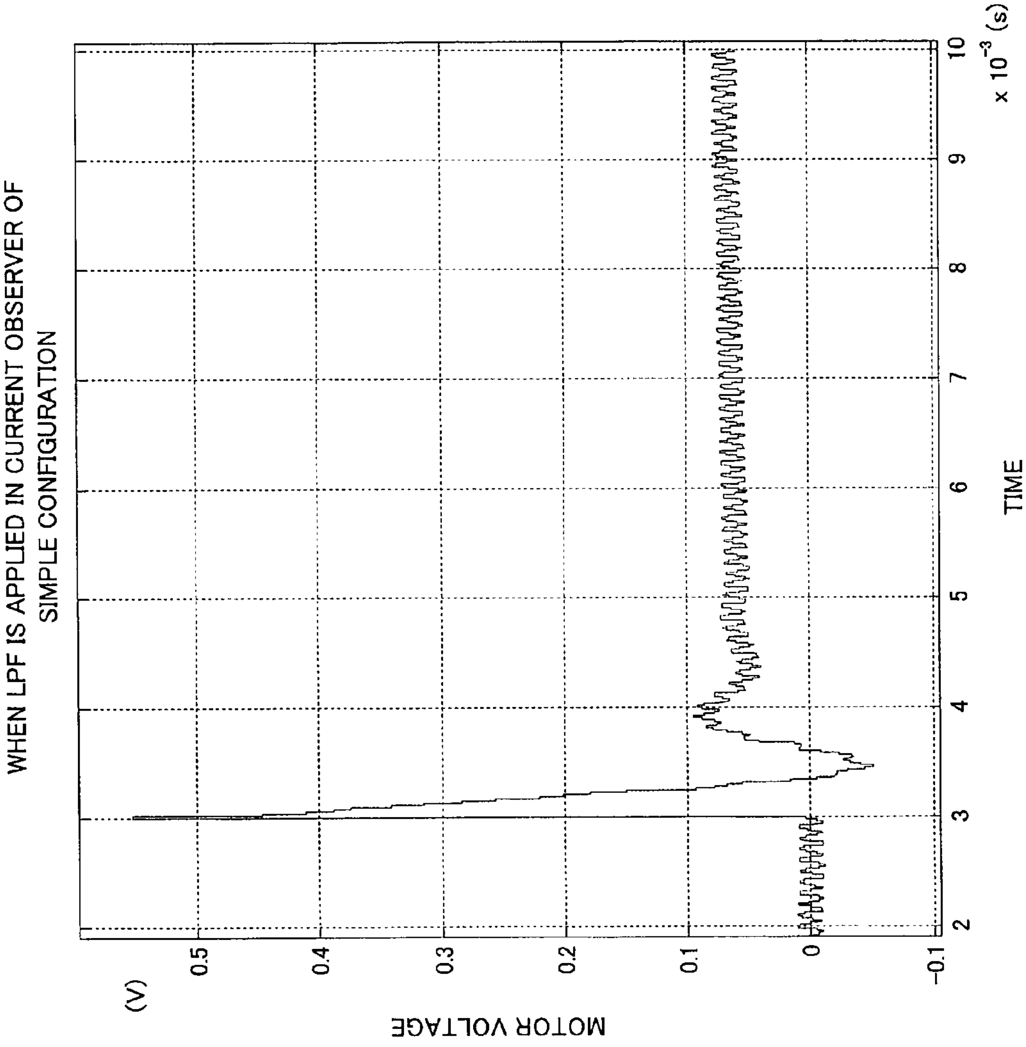
FIG. 14 is a chart illustrating a step response waveform of the motor voltage when the LPF and gain-up are applied in the current observer of simple configuration.
Figure 15:
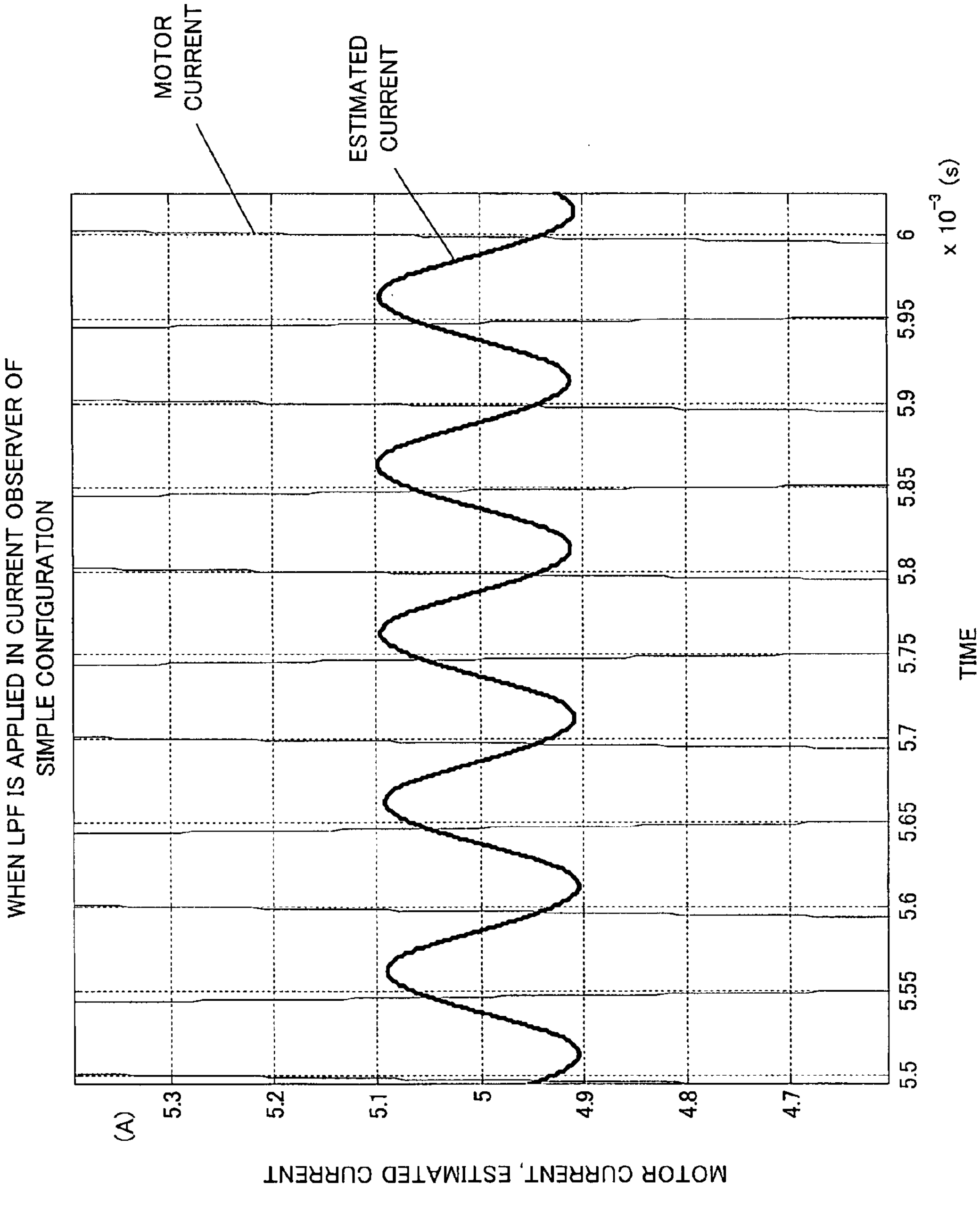
FIG. 15 is a chart corresponding to FIG. 12 when the LPF and gain-up are applied in the current observer of simple configuration.

In a case where gain-up of the current observer 14A was performed in conjunction with application of the LPF 28, the step response of the motor current corresponding to that in FIG. 10 was as illustrated in FIG. 13 and the step response of the motor voltage corresponding to that in FIG. 11 was as illustrated in FIG. 14. As is apparent from comparison of FIG. 11 with FIG. 14, although the ripple waveform was enlarged in the motor voltage by gain-up, it became possible to make the motor current in the steady state of the step response reach 5 A that is the target value of the current command. This is because owing to expansion of the response frequency band of the current observer 14A, it became possible to improve asymmetry of the ripple waveform by arranging the ripple waveform vertically symmetrically, centering around 5 A of the current command as illustrated in FIG. 15 corresponding to FIG. 12, even though the ripple waveform of the estimated current had been enlarged.

It is possible to improve a defect of not reaching the target value of the motor current caused by asymmetry of the ripple waveform even by the current observer 14A of simple configuration illustrated in FIG. 3 in the above-described manner. However, as is apparent from comparison among corresponding FIG. 8, FIG. 10 and FIG. 13, there is such a disadvantage that every time an improvement in asymmetry of the ripple waveform is made, overshoot in the step response of the motor current is increased on the other hand. This is a result of a situation that since the LPF 28 to be installed acts as a factor of greatly delaying the phase of a feedback signal and gain-up has been performed with no band widening of the current observer 14A itself, response stability of the current control system loop has been sacrificed. That is, it was difficult to attain both of the performance of reaching the target value of the motor current and the response stability of the current control system loop as long as the current observer 14A of simple configuration had been left as it was.

<Verification 1-3: Case of Phase Compensation Disturbance Current Observer>

Figure 16:
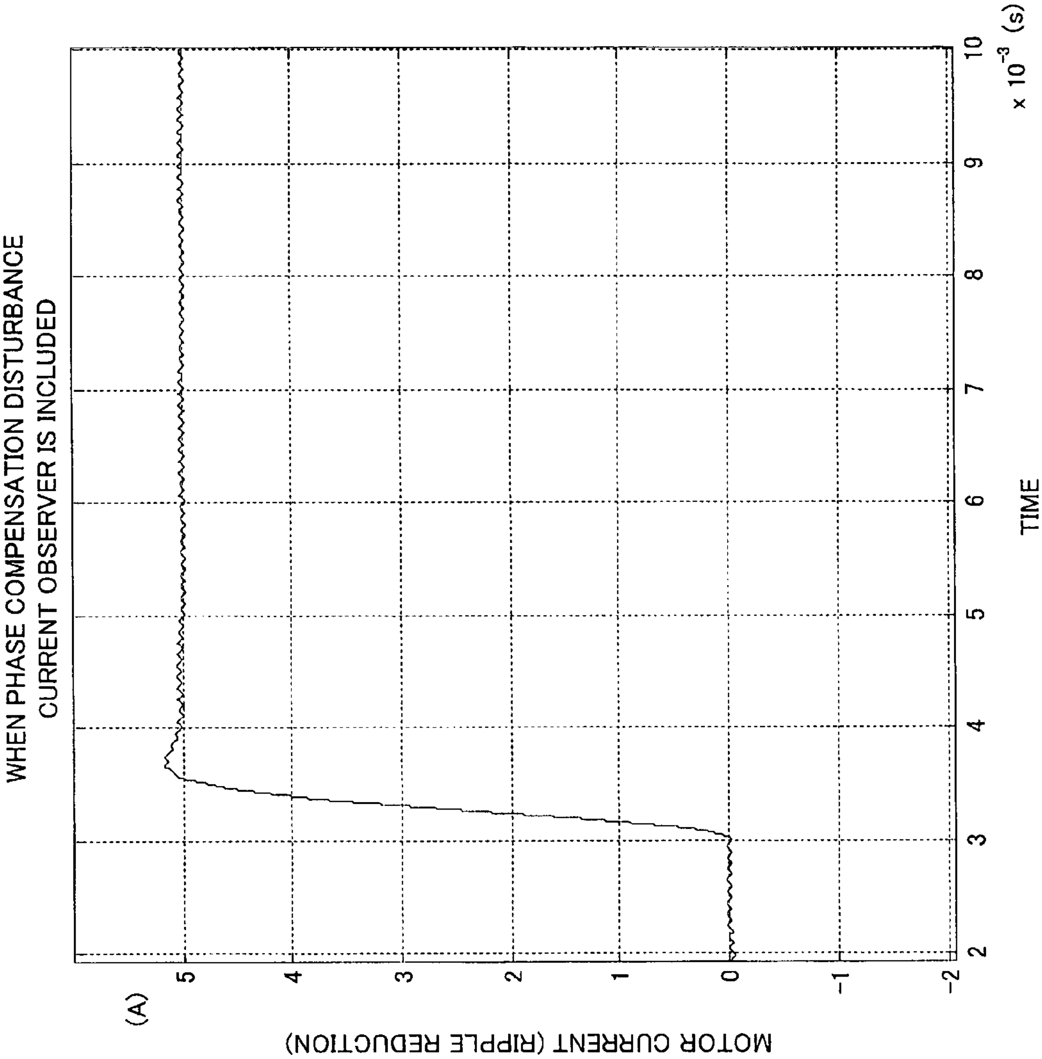
FIG. 16 is a chart corresponding to FIG. 8 when a phase compensation disturbance current observer is included.

In contrast, a case where the phase compensation disturbance current observer 14B in FIG. 4 is included in the current control system loop in the current control part 3 will be described. A simulation result of the step response corresponding to those in FIG. 8, FIG. 10 and FIG. 13 in this case is illustrated in FIG. 16.

As described above, the phase compensation disturbance current observer 14B of the present embodiment further includes the phase compensation function part 26 including the delay system model 23 and the observer gain $k_2$, in addition to the configuration of the current observer 14A of simple configuration. In addition, the motor current the ripple waveform of which has been reduced through the LPF 28 is input into the phase compensation disturbance current observer 14B. In the phase compensation disturbance current observer 14B so configured, it is set such that the delay system model 23 may compensate for a phase delay of a delay portion by the LPF 28. In addition, with respect to the two observer gains $k_1$, $k_2$, they are set to appropriate values so as to respectively stabilize the motor voltage equation model 21 and the delay system model 23 while performing gain-up to such an extent that it is possible to improve asymmetry of the ripple waveform as described above.

Thereby, it becomes possible to make the motor current reach 5 A that is the target value in the steady state of the step response and it becomes possible to greatly reduce overshoot in the transition; period. That is, according to the phase compensation disturbance current observer 14B of the present embodiment, it is possible to improve the response stability of the current control system loop while maintaining the performance of reaching the target value of the motor current.

<Verification 2-1: Case of Changing Parameters with Time>

In the foregoing, description has been made on a case where the parameters of the motor M are stabilized without changing with time. However, in the actual motor control, such fluctuations in parameters occur that the inductance fluctuates with a change in current and the winding resistance fluctuates with a change in temperature by heat generation. In this case, the parameters that have been set in advance in the motor voltage equation model 21 do not coincide with the actual parameters of the motor M, a steady state error occurs in the estimated current and the motor current fluctuates.

Figure 17:
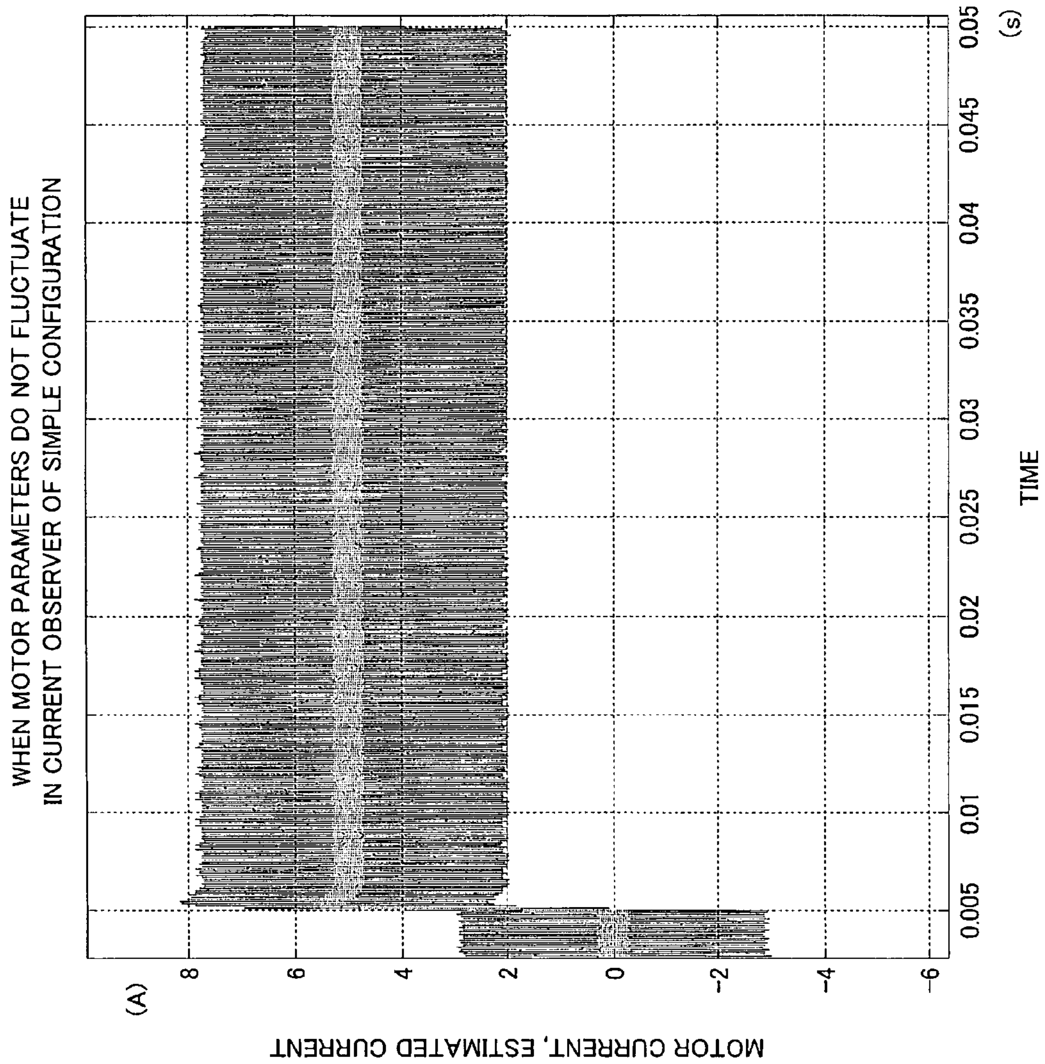
FIG. 17 is a chart corresponding to FIG. 5 when a parameter of the motor does not fluctuate in the current observer of simple configuration.
Figure 18:
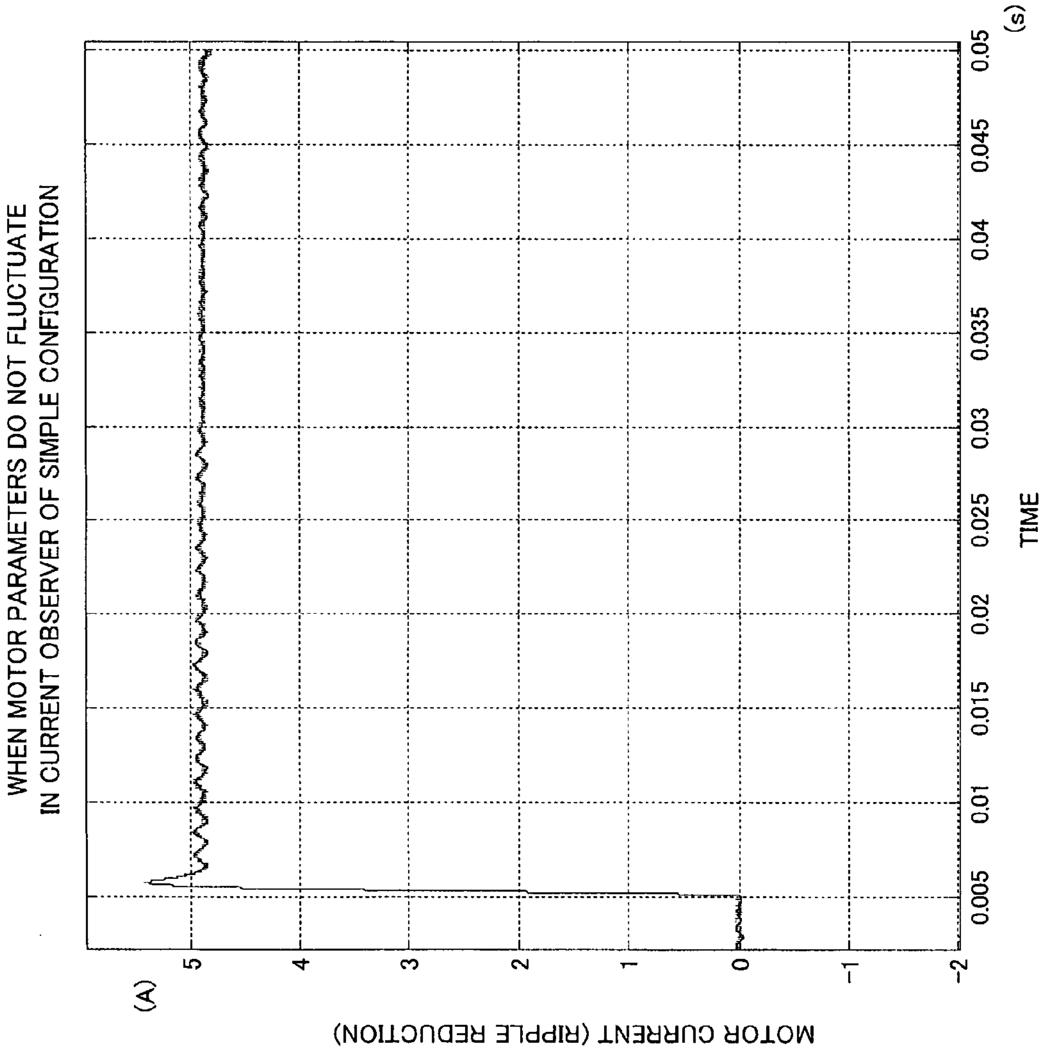
FIG. 18 is a chart corresponding to FIG. 8 when the parameter of the motor does not fluctuate in the current observer of simple configuration.
Figure 19:
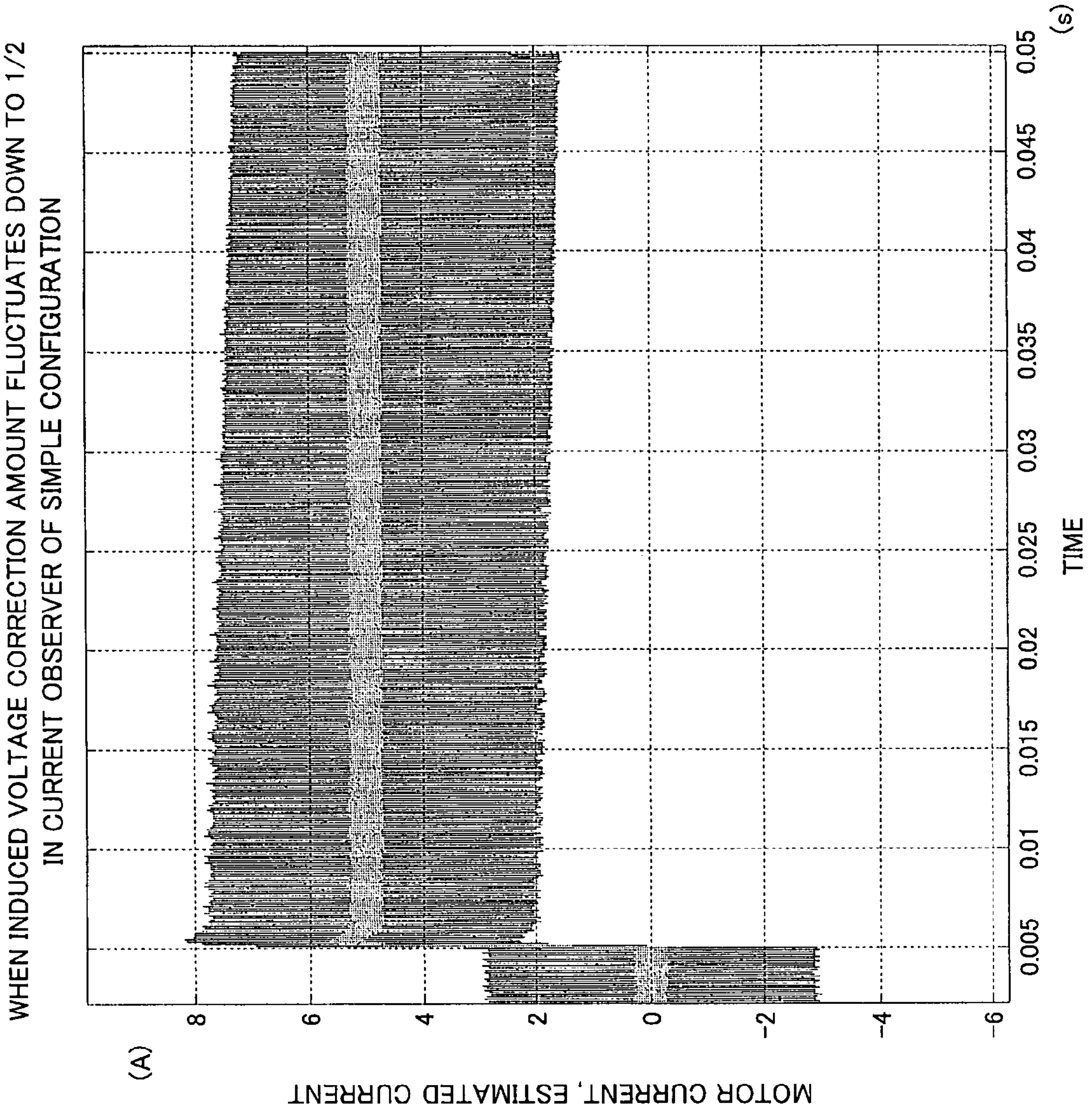
FIG. 19 is a chart corresponding to FIG. 5 when an induced voltage correction amount fluctuates down to ½ in the current observer of simple configuration.
Figure 20:
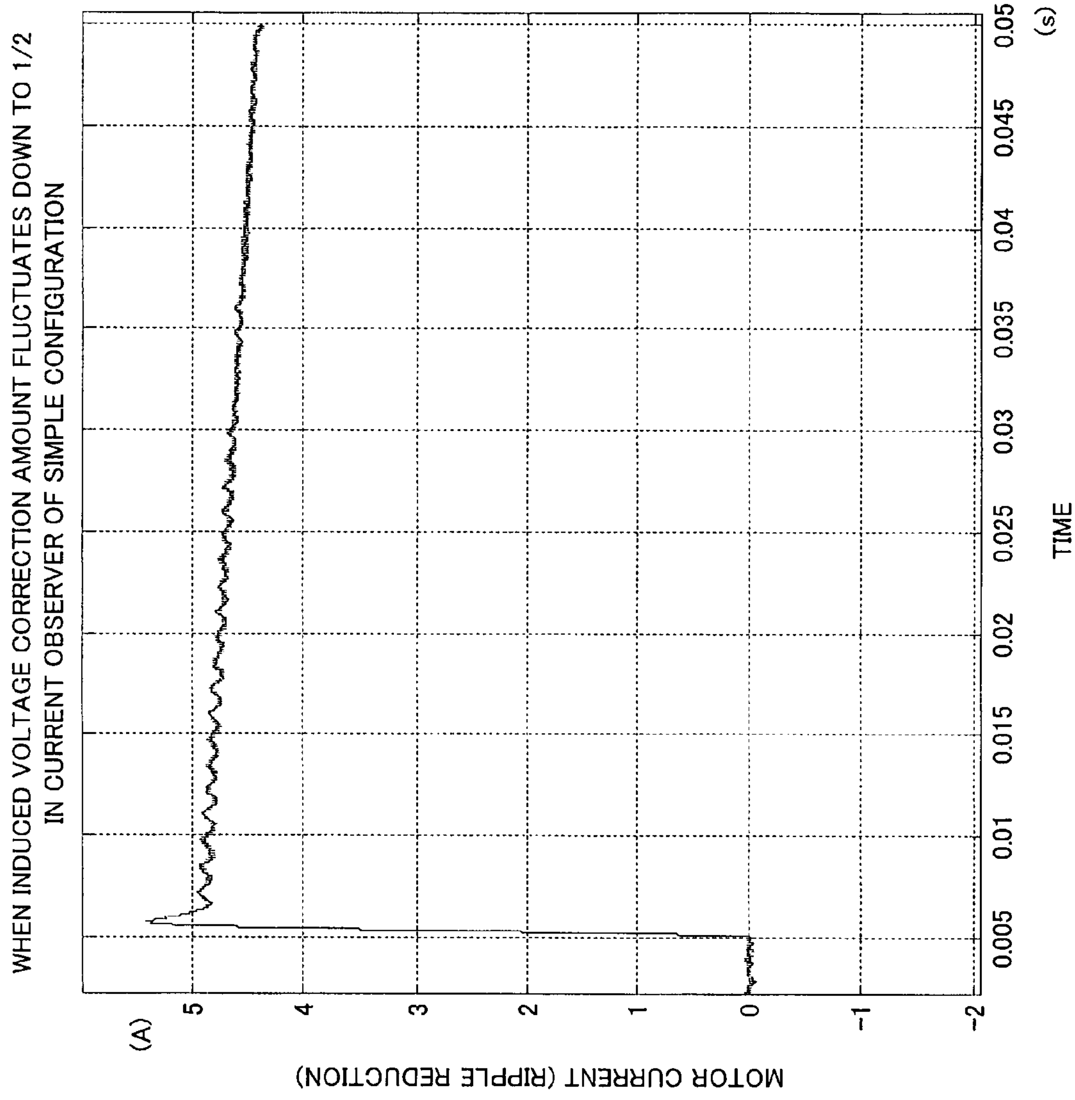
FIG. 20 is a chart corresponding to FIG. 8 when the induced voltage correction amount fluctuates down to ½ in the current observer of simple configuration.

For example, in a case where the parameters do not fluctuate by using the current observer 14A of simple configuration illustrated in FIG. 3, a waveform of the motor current is obtained as illustrated in FIG. 17 corresponding to FIG. 5, and a waveform as illustrated in FIG. 18 corresponding to FIG. 8 is obtained when removing the ripple waveform from the waveform in FIG. 17 and again observing it. However, in a case where the induced voltage correction amount calculated by the induced voltage calculation part 15 in FIG. 2 has fluctuated down to ½, the motor current is reduced with time as illustrated in FIG. 19, FIG. 20. As described above, the induced voltage calculation part 15 calculates the induced voltage on the basis of only the motor speed and it is difficult to detect yet a fluctuation in actual induced voltage which would occur in cooperation with, for example, a fluctuation in induced voltage coefficient of the motor M derived from variations of individual motors. Even in a case where the motor current has been reduced with reducing the induced voltage correction amount to ½, failing to cope with the actual fluctuation in induced voltage as described above, the estimated current that the current observer 14A outputs keeps maintaining a fixed value. If the estimated current is left still including the steady state error in this way, a current feeding-back operation will fall into a defective state, and thus the actual motor current keeps reducing as illustrated.

Figure 21:
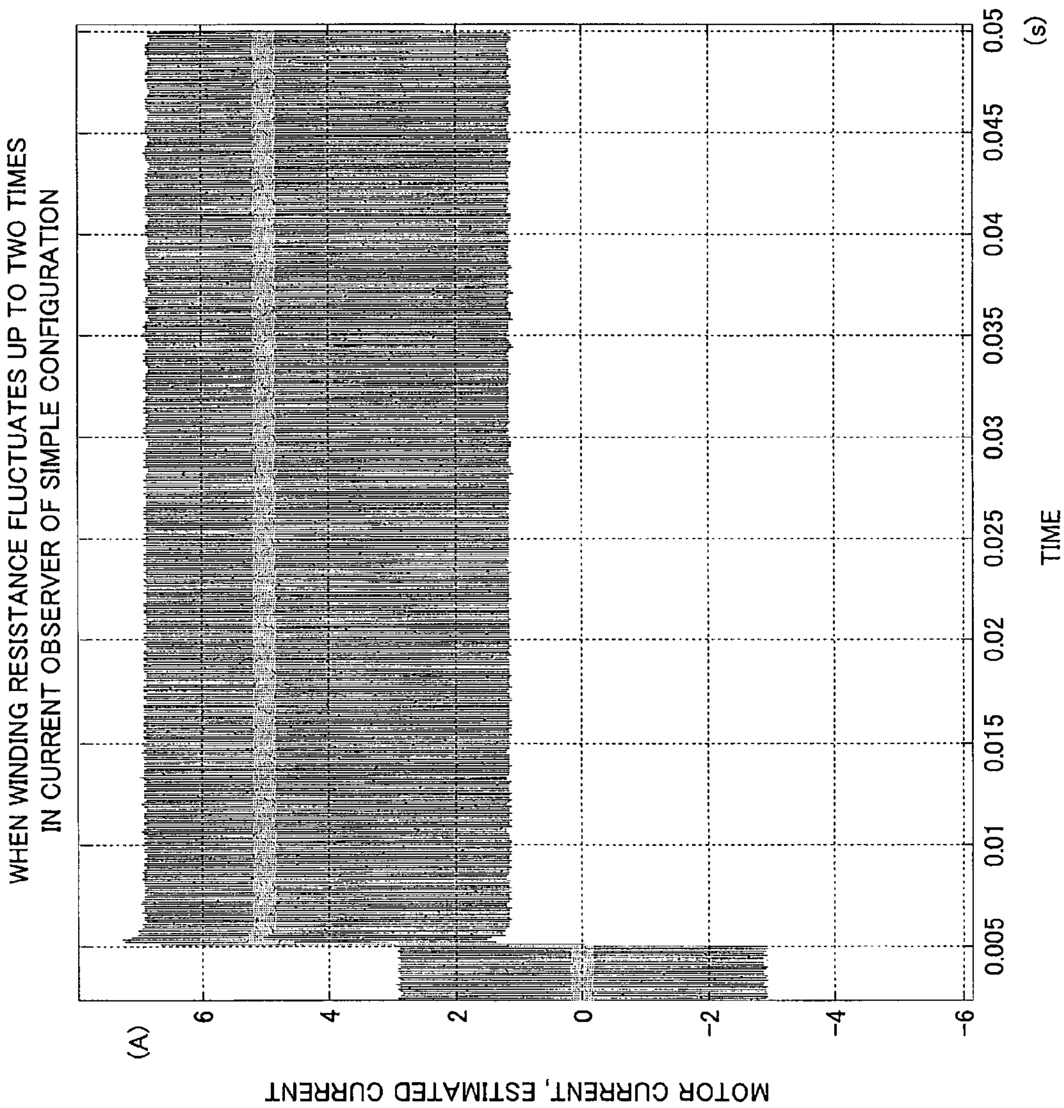
FIG. 21 is a chart corresponding to FIG. 5 when a winding resistance fluctuates up to two times in the current observer of simple configuration.
Figure 22:
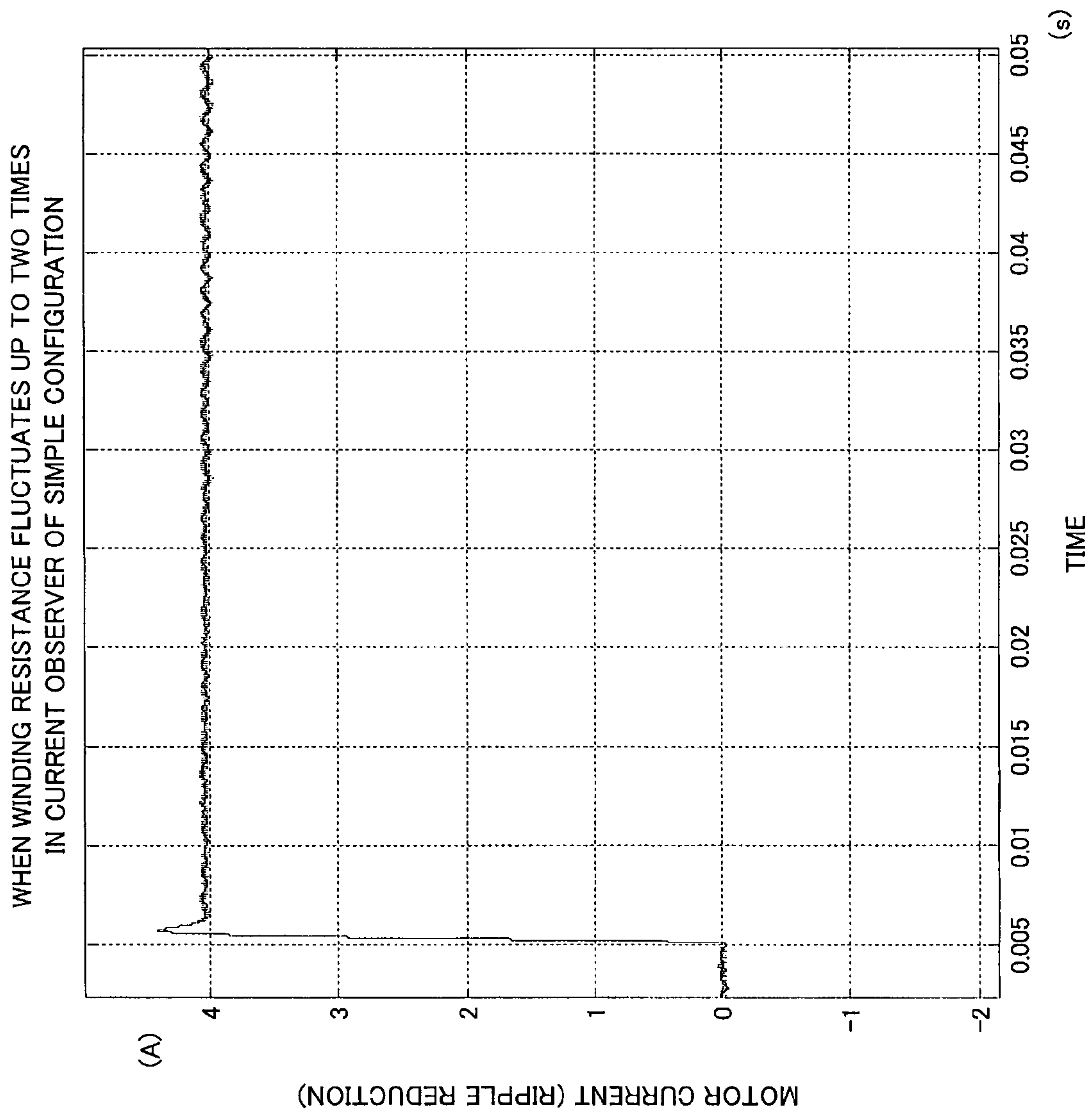
FIG. 22 is a chart corresponding to FIG. 8 when the winding resistance fluctuates up to two times in the current observer of simple configuration.
Figure 23:
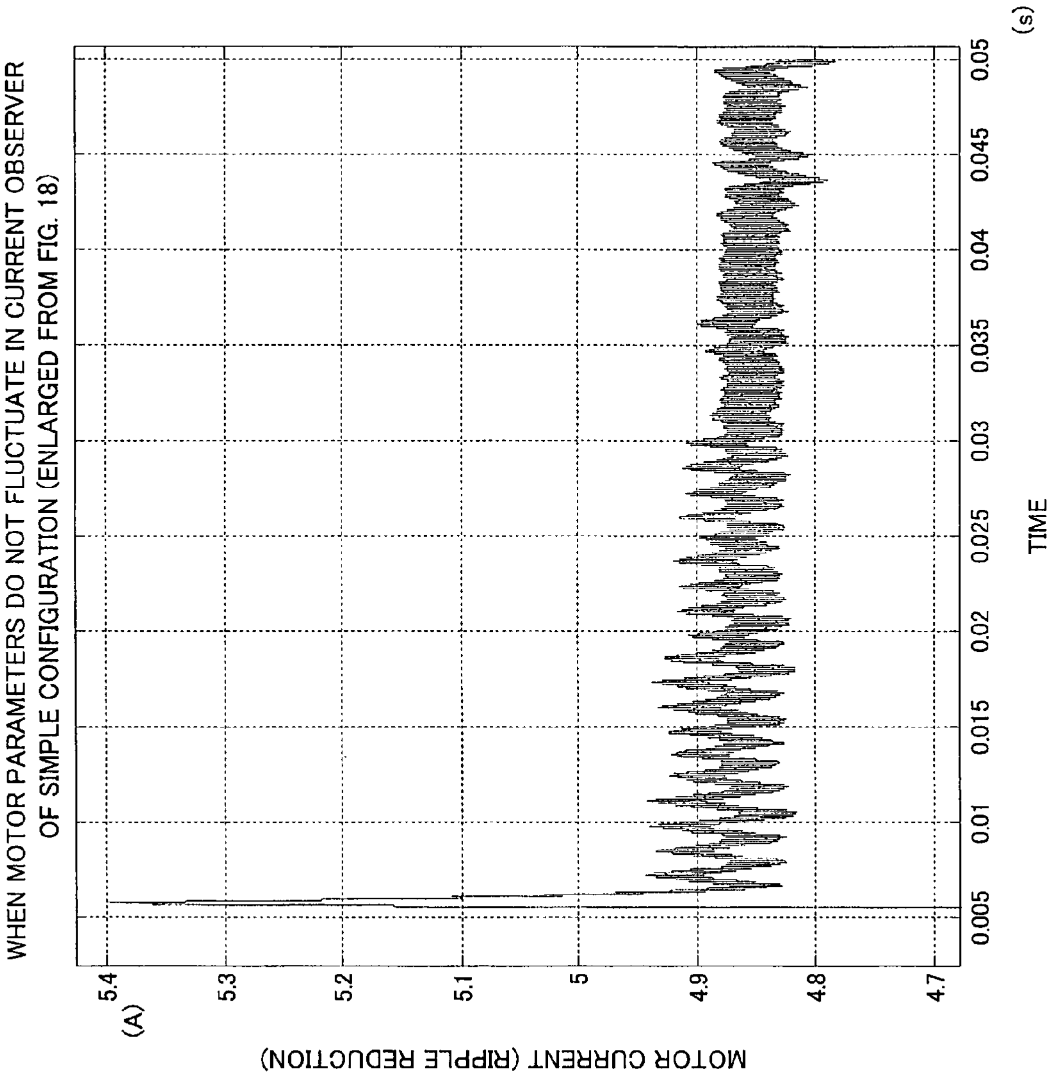
FIG. 23 is an enlarged chart of FIG. 18.
Figure 24:
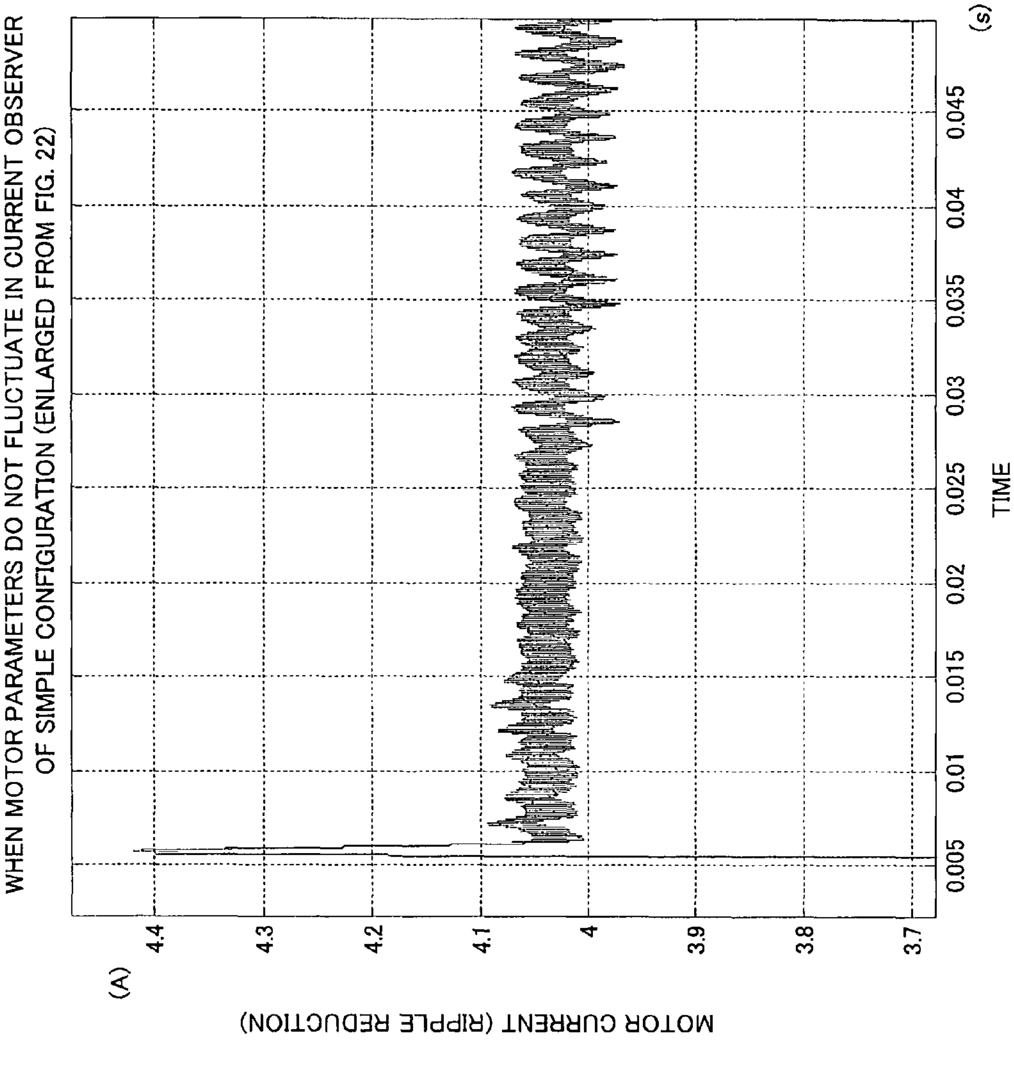
FIG. 24 is an enlarged chart of FIG. 22.

In addition, in a case where the winding resistance of the motor M has fluctuated up to two times by heat generation, the motor current in the steady state is greatly reduced from 5 A that is the target value as respectively illustrated in FIG. 21 corresponding to FIG. 17 and FIG. 22 corresponding to FIG. 18 (down to approximately 4 A in the illustrated example). This is also obvious from comparison of FIG. 23 that is an enlarged chart of FIG. 18 illustrating a case where the winding resistance does not fluctuate with FIG. 24 that is an enlarged chart of FIG. 22 illustrating a case where the winding resistance has fluctuated.

<Verification 2-2: Case of Phase Compensation Disturbance Current Observer>

In contrast, in a case where the phase compensation disturbance current observer 14B in FIG. 4 is included in the current control system loop in the current control part 3, the fluctuation in each of the above-described parameters is regarded as a disturbance and is compensated for, thereby making it possible to converge the estimated current to the true value.

As described above, the phase compensation disturbance current observer 14B of the present embodiment further includes the disturbance compensation function part 27 including the observer gain $k_3$ and the integrator 24, in addition to the configuration of the current observer 14A of simple configuration. In the phase compensation disturbance current observer 14B so configured, the observer gain $k_3$ is appropriately set so as to compensate for the disturbance (that is, the deviation between the output of the delay system model 23 and the actually detected motor current) occurred caused by the fluctuations in parameters of the motor M such as the winding resistance, the inductance and so forth and the variations and so forth relative to the design values.

Figure 25:
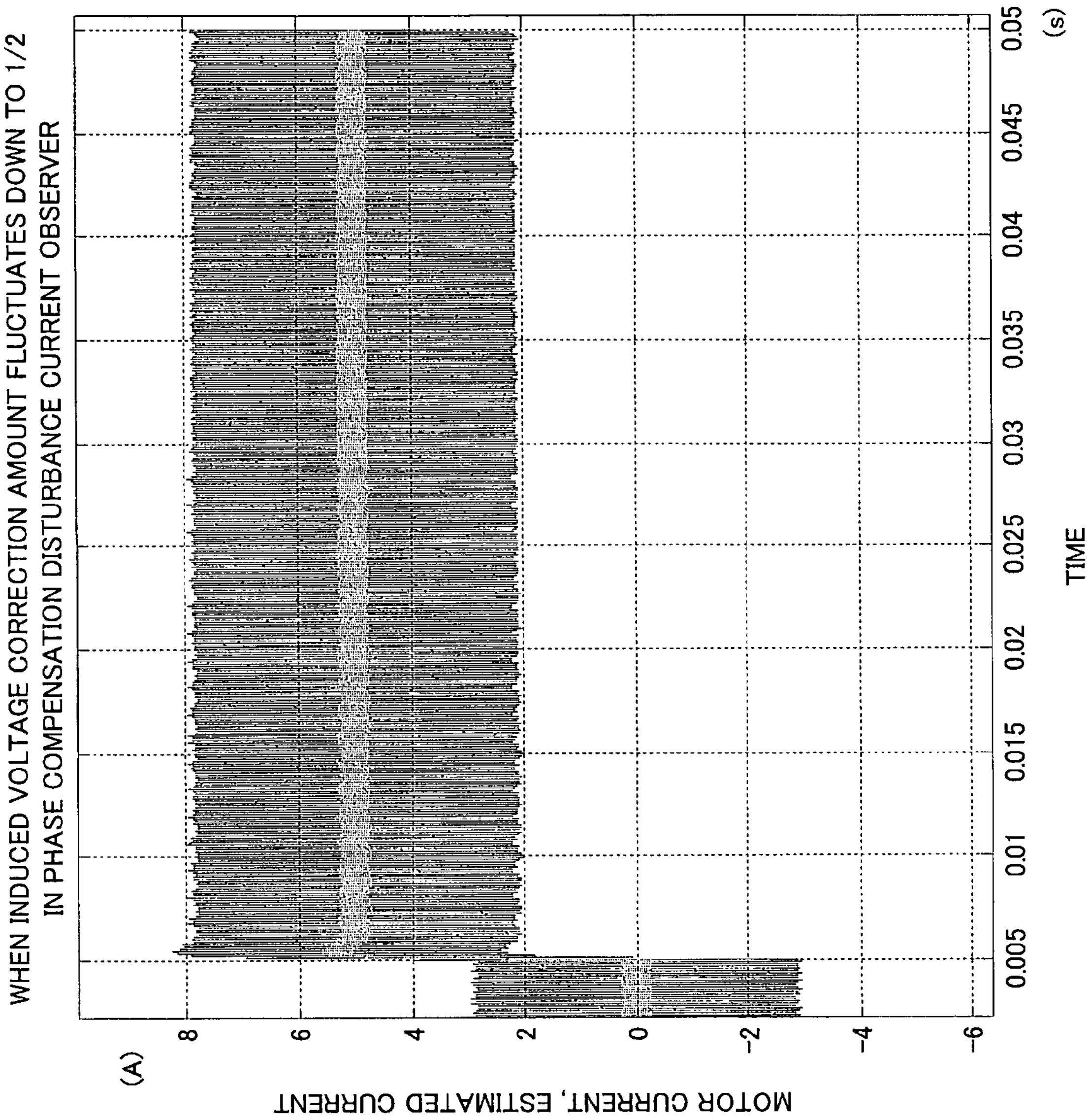
FIG. 25 is a chart illustrating a step response waveform of the motor current when the induced voltage correction amount fluctuates down to ½ in the phase compensation disturbance current observer.
Figure 26:
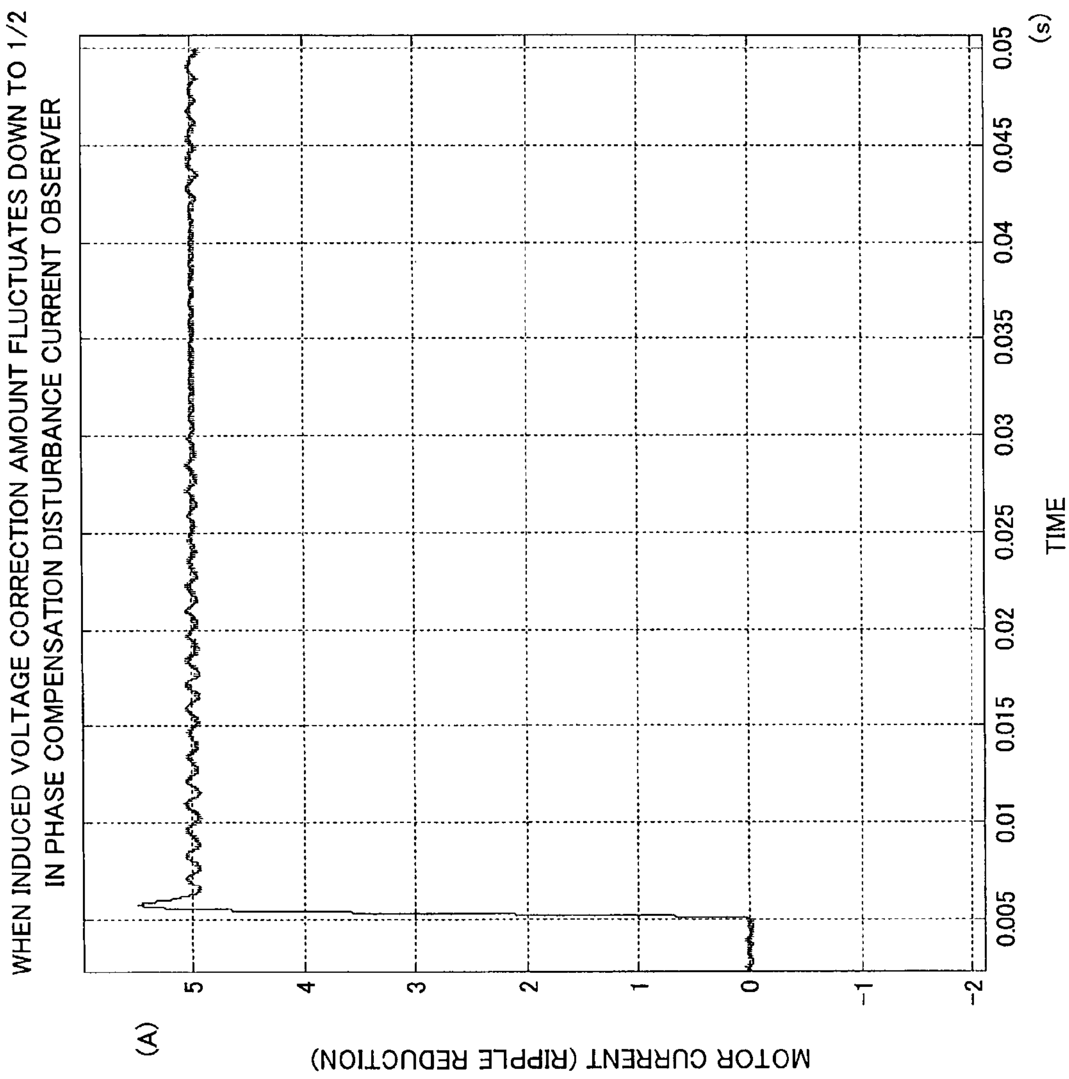
FIG. 26 is a chart corresponding to FIG. 8 when the induced voltage correction amount fluctuates down to ½ in the phase compensation disturbance current observer.
Figure 27:
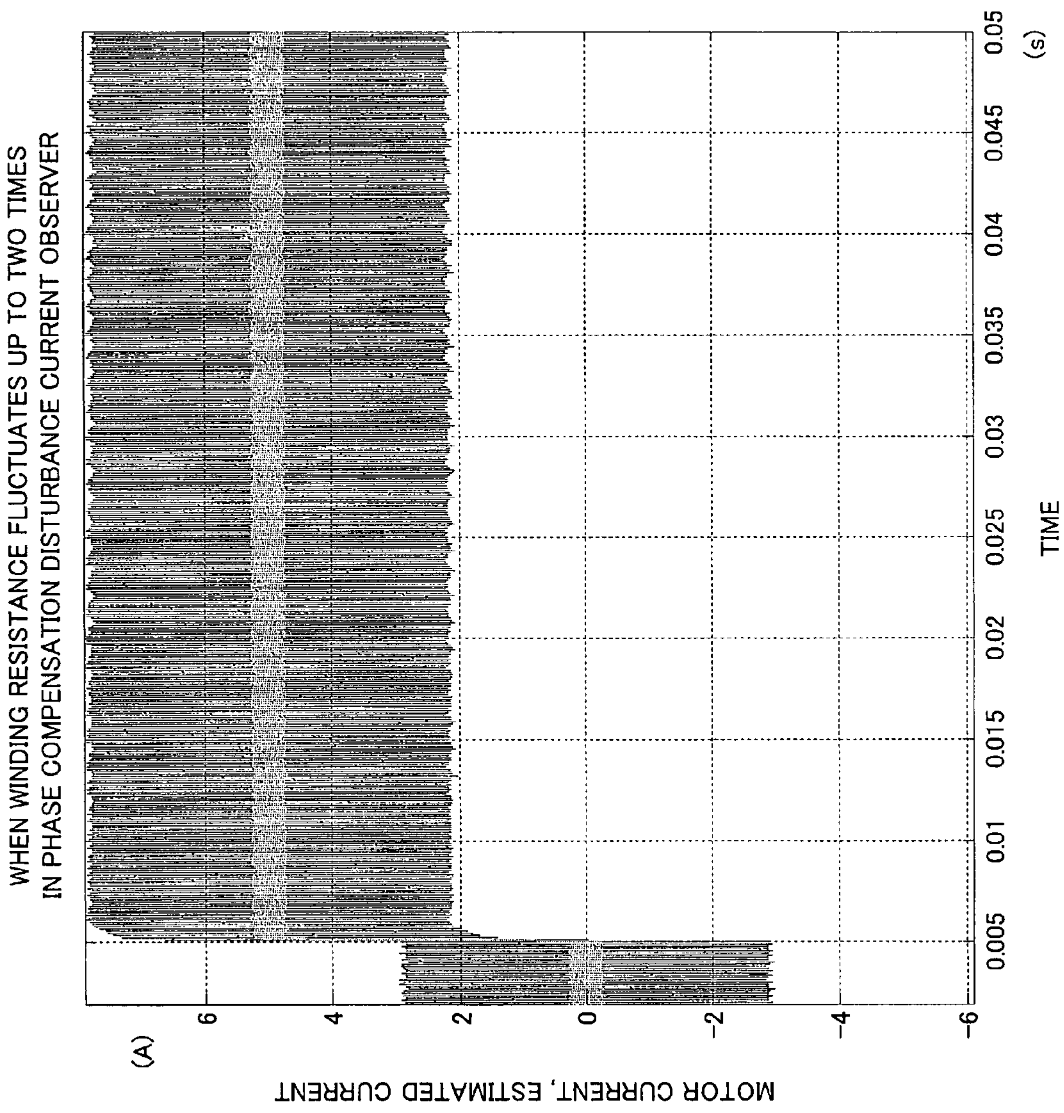
FIG. 27 is a chart illustrating a step response waveform of the motor current when the winding resistance fluctuates up to two times in the phase compensation disturbance current observer.
Figure 28:
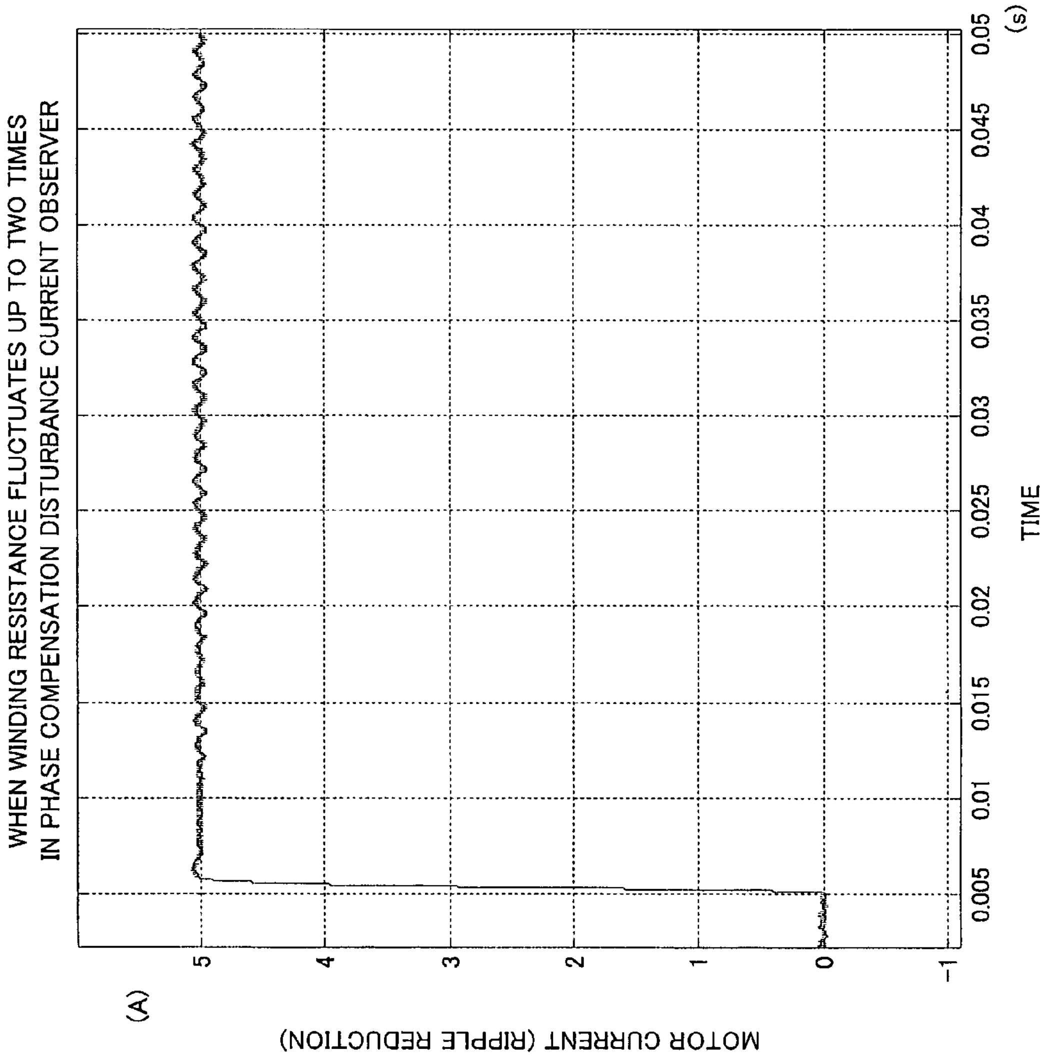
FIG. 28 is a chart corresponding to FIG. 8 when the winding resistance fluctuates up to two times in the phase compensation disturbance current observer.

Thereby, even in a case where the induced voltage correction amount has been reduced to ½, it is possible to make the values of both of the motor current and the estimated current continuously coincide with 5 A that is the target value stably as respectively illustrated in FIG. 25 corresponding to FIG. 19 and FIG. 26 corresponding to FIG. 20. In addition, likewise, even in a case where the winding resistance of the motor M has fluctuated up to two times, it is possible to make the values of both of the motor current and the estimated current continuously coincide with 5 A that is the target value stably as respectively illustrated in FIG. 27 corresponding to FIG. 19 and FIG. 28 corresponding to FIG. 20.

Incidentally, since the disturbance compensation function part 27 so configured functions to converge the estimated current to the true value by eliminating the steady state error included in the estimated current, it also contributes to improvement in vertical asymmetry of the ripple waveform described above. That is, it is possible to attain the performance of reaching the target value of the motor current without performing gain-up (setting to increase the observer gain $k_1$) of the current observer 14A described in <Verification 1-2b>. In addition, although inclusion of the disturbance compensation function part 27 has an influence on the response stability of the current control system loop (for example, overshoot in the transition period is increased), it is possible to ensure sufficiently high response stability by performing adjustment by the phase compensation function part 26 while taking the influence into consideration. That is, the disturbance compensation function part 27 and the phase compensation function part 26 mutually complement, thereby making it possible to functionally attain both of the performance of reaching the target value of the motor current and the response stability of the current control system loop.

In the foregoing, the phase compensation disturbance current observer 14B corresponds to an example of a phase compensation part described in each claim.

The PI compensation part 11 corresponds to an example of means for generating a voltage command described in claims. The voltage conversion part 12 corresponds to an example of means for controlling an output voltage to a motor described in claims. The current detection part 13 corresponds to an example of means for detecting a motor current described in claims. The phase compensation disturbance current observer 14B corresponds to an example of means for generating the estimated current described in claims.

According to the embodiments described above, advantageous effects as follows are obtained. That is, in the motor control apparatus 100 of the present embodiment, the phase compensation disturbance current observer 14B inputs the detected motor current and the voltage command, compensates for the phase delay of the motor current using the voltage command with no phase delay and outputs the current as the estimated current. Thereby, since it is possible to suppress the influence of the delay element by PWM control of the voltage conversion part 12, gain increasing and band widening of the current control system loop become possible. In addition, as a result, since also gain increasing and band widening of the speed control system loop and the position control system loop become possible, it is possible to reduce the positioning time of a servo and to improve productivity and so forth of the machine. In addition, owing to inclusion of the phase compensation disturbance current observer 14B, such advantageous effects are obtained that it is possible to improve responsiveness of the motor current and it is possible to make the response characteristic of the control system closer to an ideal characteristic.

In addition, in the present embodiment, in particular, the phase compensation disturbance current observer 14B includes the motor voltage equation model 21, the delay system model 23, and the two observer gains $k_1$, $k_2$. The phase of the current value output from the delay system model 23 is delayed from that of the current value output from the motor voltage equation model 21. That is, the current value from the motor voltage equation model 21 leads from that of the motor current detected by the current detection part 13. It is possible to feed back the estimated current value with no phase delay by outputting this phase-leading current value as the estimated current.

In addition, in the present embodiment, in particular, the phase compensation disturbance current observer 14B includes the observer gain $k_3$ to be multiplied by the deviation between the motor current detected by the current detection part 13 and the output of the delay system model 23, and the integrator 24 that integrates the outputs of the observer gain $k_3$ and outputs an estimated disturbance. The phase compensation disturbance current observer 14B comes to have disturbance suppressing action by adding this estimated disturbance to the voltage command and inputting the resultant voltage command to the motor voltage equation model 21. Thereby, it becomes possible to converge the current estimated value to the true value regardless of occurrence of parameter fluctuations caused by changes in winding resistance, inductance and so forth.

In addition, in the present embodiment, in particular, the LPF 28 is disposed between the current detection part 13 and the phase compensation disturbance current observer 14B so as to remove the high-frequency component in the motor current to be input from the current detection part 13 into the phase compensation disturbance current observer 14B. Thereby, since it is possible to reduce the ripple components included in the motor current, it is possible to suppress generation of the DC components caused by the beat phenomenon. In addition, as a cause for not making the motor current reach the target value, it is also conceivable that it is difficult for the response speed of the phase compensation disturbance current observer 14B to follow the ripple component in the motor current to be input into the phase compensation disturbance current observer 14B, in addition to the above. It is possible to cope with this also by increasing the observer gain and widening the bandwidth of the phase compensation disturbance current observer 14B. Owing to the above, it becomes possible to make the motor current reach the target value. Incidentally, although the LPF 28 acts as the delay element of the current control system loop, since it is possible to suppress the influence of the delay element by the phase compensation function part 26 of the phase compensation disturbance current observer 14B as described above, it is possible to prevent degradation of the responsiveness of the motor current caused by inclusion of the LPF 28.

Figure 29:
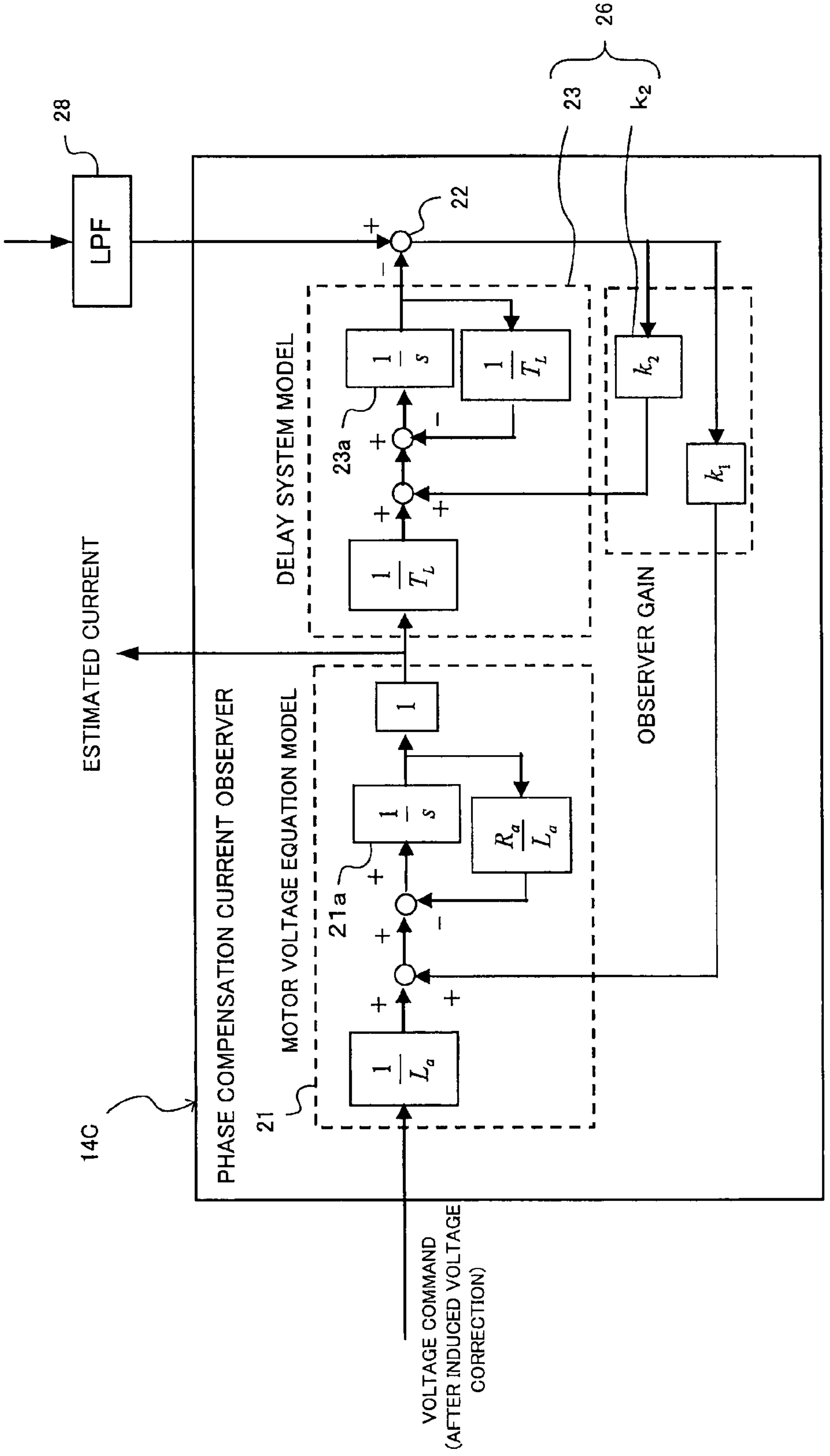
FIG. 29 is a detailed block diagram illustrating a phase compensation current observer.

Incidentally, although in the embodiment, an example of the phase compensation disturbance current observer 14B in which both of the phase compensation function part 26 and the disturbance compensation function part 27 have been added to the configuration (see FIG. 3) of the current observer 14A of simple configuration has been described as the current observer 14 that makes the estimated current output, the present disclosure is not limited to this. For example, as illustrated in FIG. 29, a phase compensation current observer 14C in which only the phase compensation function part 26 has been added to the configuration of the current observer 14A of simple configuration may be used. In a case where the parameter fluctuation of the motor M is little, it is possible to attain both of the performance of reaching the target value of the motor current and the response stability simply by using the phase compensation current observer 14C having the comparatively simple configuration.

Figure 30:
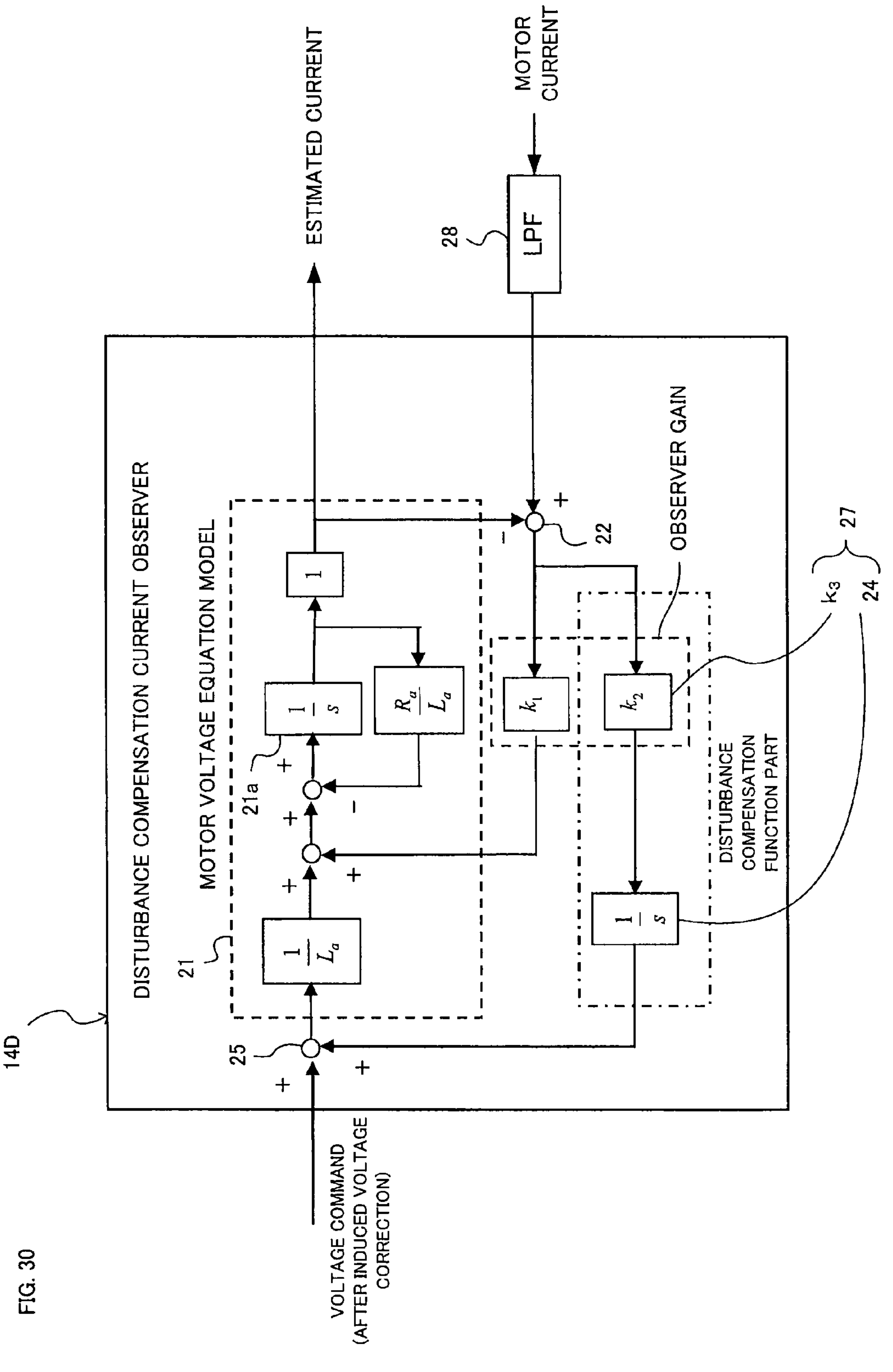
FIG. 30 is a detailed block diagram illustrating a disturbance compensation current observer.

In addition, as illustrated in FIG. 30, a disturbance compensation current observer 14D in which only the disturbance compensation function part 27 has been added to the configuration of the current observer 14A of simple configuration may be used. In a case where vertical symmetry of the motor current is sufficiently ensured only by disturbance compensation and the overshoot and so forth are little, it is possible to attain both of the performance of reaching the target value of the motor current and the response stability simply by using the phase compensation current observer 14D having the comparatively simple configuration.

In addition, although in the foregoing, description has been made on the assumption that the DC motor is used as the motor M, the present disclosure is not limited to this and is also applicable to a case where an AC motor is used. For example, in a motor control apparatus configured to control driving of a three-phase AC motor, there are many configurations in which, in general, current control and voltage control are performed by providing the PI compensation part 11 for each axis of biaxial coordinates of d-q axes, and after coordinate transformation from the d-q axes into UVW three phases has been performed, the driving current is output to the three-phase AC motor by three-phase PWM control. In this case, a three-phase AC motor current to be input into the three-phase AC motor is detected by the current detection part and after reverse coordinate transformation from the three phases into the d-q axes has been performed on the current, the current is fed back to the current control corresponding to each axis of the d-q axes. In this configuration, any of the phase compensation disturbance current observer 14B, the phase compensation current observer 14C, and the disturbance compensation current observer 14D of the embodiments may be disposed corresponding to each motor detection current of each of the d-q axes that has been subjected to reverse coordinate transformation from the three phases into the d-q axes and the estimated current that has been output may be fed back (not illustrated in particular). Also in this case, it is possible to obtain the same advantageous effects as those of the embodiments. Incidentally, the motor control apparatus 100 of the embodiments using the DC motor M may be deemed to be equivalent to a case where the current command of any one of the d-q axes has been reduced to zero.

In addition, other than the embodiments and examples described above, the techniques by the embodiments and modified examples may be utilized by appropriately combing them together.

In addition, though not illustrated one by one, the present embodiment is carried out with addition of various modifications within the scope not deviating from the gist of the present disclosure.

What is claimed is:

1. A motor control apparatus comprising:

a current conversion part configured to generate a voltage command on the basis of a current deviation between a current command and an estimated current;

a voltage control part configured to control an output voltage to a motor on the basis of the voltage command;

a current detection part configured to detect a motor current to be supplied to the motor; and a phase compensation part configured to input the detected motor current and the voltage command and to output, as the estimated current, the motor current in which a delay in phase of the motor current relative to the current command has been compensated, wherein the phase compensation part includes:

a voltage equation model of the motor configured to input the voltage command and to output the estimated current;

a delay system model that models a delay element of a current control system; and a first observer gain and a second observer gain that are multiplied by a difference between the detected motor current and an output of the delay system model, and wherein an output of the first observer gain is added to the voltage equation model of the motor and an output of the second observer gain is added to the delay system model.

2. The motor control apparatus according to claim 1, wherein;

the phase compensation part further includes:

a third observer gain that is multiplied by the difference between the detected motor current and the output of the delay system model; and an integrator configured to integrate an output of the third observer gain, and an output of the integrator is added to the voltage command.

3. The motor control apparatus according to claim 1, further comprising:

a low-pass filter configured to remove a high frequency component in the motor current to be input from the current detection part into the phase compensation part.

4. The motor control apparatus according to claim 1, wherein;

the motor control apparatus is configured to be capable of controlling a current of a d-axis and a current of a q-axis of a three-phase AC motor as the motor independently of each other, and the motor control apparatus includes the current conversion part and the phase compensation part in each of the current control system of the d-axis and the current control system of the q-axis.

5. The motor control apparatus according to claim 2, further comprising:

a low-pass filter configured to remove a high frequency component in the motor current to be input from the current detection part into the phase compensation part.

6. The motor control apparatus according to claim 2, wherein;

the motor control apparatus is configured to be capable of controlling a current of a d-axis and a current of a q-axis of a three-phase AC motor as the motor independently of each other, and the motor control apparatus includes the current conversion part and the phase compensation part in each of the current control system of the d-axis and the current control system of the q-axis.

7. The motor control apparatus according to claim 3, wherein;

the motor control apparatus is configured to be capable of controlling a current of a d-axis and a current of a q-axis of a three-phase AC motor as the motor independently of each other, and the motor control apparatus includes the current conversion part and the phase compensation part in each of the current control system of the d-axis and the current control system of the q-axis.

8. The motor control apparatus according to claim 5, wherein;

the motor control apparatus is configured to be capable of controlling a current of a d-axis and a current of a q-axis of a three-phase AC motor as the motor independently of each other, and the motor control apparatus includes the current conversion part and the phase compensation part in each of the current control system of the d-axis and the current control system of the q-axis.

9. A motor control apparatus comprising:

a current conversion part configured to generate a voltage command on the basis of a current deviation between a current command and an estimated current;

a voltage control part configured to control an output voltage to a motor on the basis of the voltage command;
a current detection part configured to detect a motor current to be supplied to the motor; and
a current observer configured to output the estimated current, the current observer including a phase compensation function part configured to compensate for a phase delay of the detected motor current relative to the current command,
wherein the phase compensation function part includes:
a delay system model that models a delay element of a current control system; and
a second observer gain that are multiplied by a difference between the detected motor current and an output of the delay system model, an output of the second observer gain being added to the delay system model.

10. The motor control apparatus according to claim 9, further comprising:

a disturbance compensation function part configured to compensate an influence of a disturbance of the detected motor current, the disturbance compensation function part comprising:
a third observer gain that is multiplied by the difference between the detected motor current and the output of the delay system model; and
an integrator configured to integrate an output of the third observer gain.

11. A motor control apparatus comprising:

a current conversion part configured to generate a voltage command on the basis of a current deviation between a current command and an estimated current;
a voltage control part configured to control an output voltage to a motor on the basis of the voltage command;
a current detection part configured to detect a motor current to be supplied to the motor;
a phase compensation part configured to input the detected motor current and the voltage command and to output, as the estimated current, the motor current in which a delay in phase of the motor current relative to the current command has been compensated; and
a low-pass filter configured to remove a high frequency component in the motor current to be input from the current detection part into the phase compensation part.

* * * * *